United States Patent
Honma et al.

(10) Patent No.: US 9,772,914 B2
(45) Date of Patent: Sep. 26, 2017

(54) PROCESSING APPARATUS, PROCESS SYSTEM, AND NON-TRANSITORY COMPUTER-READABLE RECORDING MEDIUM

(71) Applicant: FUJITSU LIMITED, Kawasaki-shi, Kanagawa (JP)

(72) Inventors: Tsuyoshi Honma, Nagoya (JP); Kiyoshi Kouge, Kuwana (JP); Hiroyuki Yamaguchi, Toyota (JP); Takahiro Inagaki, Ama (JP)

(73) Assignee: FUJITSU LIMITED, Kawasaki (JP)

( * ) Notice: Subject to any disclaimer, the term of this patent is extended or adjusted under 35 U.S.C. 154(b) by 338 days.

(21) Appl. No.: 14/580,429

(22) Filed: Dec. 23, 2014

(65) Prior Publication Data
US 2015/0113320 A1    Apr. 23, 2015

Related U.S. Application Data

(63) Continuation of application No. PCT/JP2012/067230, filed on Jul. 5, 2012.

(51) Int. Cl.
*G06F 11/00* (2006.01)
*G06F 11/20* (2006.01)
(Continued)

(52) U.S. Cl.
CPC ........ *G06F 11/203* (2013.01); *G06F 11/0721* (2013.01); *G06F 11/2023* (2013.01);
(Continued)

(58) Field of Classification Search
CPC ............ G06F 11/2025; G06F 11/2028; G06F 11/0721; G06F 11/0793; G06F 11/0709
See application file for complete search history.

(56) References Cited

U.S. PATENT DOCUMENTS 5,983,359 A * 11/1999 Nota ................... G06F 11/2035
714/10
6,543,028 B1 * 4/2003 Jamil .................. G06F 11/1032
714/52
(Continued)

FOREIGN PATENT DOCUMENTS

JP    1-195544    8/1989
JP    7-295918    11/1995
(Continued)

OTHER PUBLICATIONS

Patent Abstracts of Japan, Publication No. 2009-129148, published Jun. 11, 2009.
(Continued)

*Primary Examiner* — Charles Ehne
(74) *Attorney, Agent, or Firm* — Staas & Halsey LLP

(57) ABSTRACT

A processing apparatus includes a precursor detection unit that detects a precursor event indicating a precursor that a target process cannot be executed by a process unit, and a control unit that sends a preparation request to a substitution processing apparatus when the precursor detection unit detects the precursor event in which the preparation request requests the substitution processing apparatus being a ready state for starting a substitution processing. The control unit sends a termination request to the substitution processing apparatus when a predetermined condition is satisfied after the control unit sends the preparation request, in which the termination request requests the substitution processing apparatus terminating the ready state.

16 Claims, 22 Drawing Sheets

(51) Int. Cl.
*G06F 11/07* (2006.01)
*G06F 11/14* (2006.01)

(52) U.S. Cl.
CPC ...... *G06F 11/2025* (2013.01); *G06F 11/2028* (2013.01); *G06F 11/1484* (2013.01); *G06F 11/2046* (2013.01)

(56) References Cited

U.S. PATENT DOCUMENTS

| | | | |
|---|---|---|---|
| 8,418,000 B1* | 4/2013 | Salame | G06F 11/079 714/26 |
| 2004/0003319 A1 | 1/2004 | Ukai et al. | |
| 2005/0228947 A1 | 10/2005 | Morita et al. | |
| 2007/0050661 A1* | 3/2007 | Ferren | G06F 11/0721 714/1 |
| 2008/0148015 A1 | 6/2008 | Takamoto et al. | |
| 2009/0138753 A1 | 5/2009 | Tameshige et al. | |
| 2009/0235112 A1 | 9/2009 | Kawamura | |
| 2010/0251016 A1* | 9/2010 | Abernathy | G06F 9/3838 714/15 |
| 2011/0107138 A1 | 5/2011 | Tameshige et al. | |

FOREIGN PATENT DOCUMENTS

| | | |
|---|---|---|
| JP | 2004-30363 | 1/2004 |
| JP | 2005-301442 | 10/2005 |
| JP | 2008-152594 | 7/2008 |
| JP | 2009-129148 | 6/2009 |
| JP | 2009-223582 | 10/2009 |
| JP | 2010-160623 | 7/2010 |
| JP | 2011-128967 | 6/2011 |
| JP | 2011-248735 | 12/2011 |

OTHER PUBLICATIONS

Patent Abstracts of Japan, Publication No. 2009-223582, published Oct. 1, 2009.
Patent Abstracts of Japan, Publication No. 7-295918, published Nov. 10, 1995.
Japanese Office Action dated Mar. 8, 2016 in corresponding Japanese Patent Application No. 2014-523504.
Patent Abstracts of Japan, Publication No. 01-195544, published Aug. 7, 1989.
Patent Abstracts of Japan, Publication No. 2004-030363, published Jan. 29, 2004.
Patent Abstracts of Japan, Publication No. 2005-301442, published Oct. 27, 2005.
Patent Abstracts of Japan, Publication No. 2008-152594, published Jul. 3, 2008.
Patent Abstracts of Japan, Publication No. 2010-160623, published Jul. 22, 2010.
Patent Abstracts of Japan, Publication No. 2011-128967, published Jun. 30, 2011.
Patent Abstracts of Japan, Publication No. 2011-248735, published Dec. 8, 2011.
International Search Report dated Oct. 9, 2012, in corresponding International Application No. PCT/JP2012/067230.

* cited by examiner

PROCESSING APPARATUS, PROCESS SYSTEM, AND NON-TRANSITORY COMPUTER-READABLE RECORDING MEDIUM

CROSS-REFERENCE TO RELATED APPLICATIONS

This application is a U.S. continuation application filed under 35 USC 111 (a) claiming benefit under 35 USC 120 and 365 (c) of PCT application PCT/JP2012/067230, filed on Jul. 5, 2012. The foregoing application is hereby incorporated herein by reference.

FIELD

The embodiment discussed herein is related to a processing apparatus, a process system, and a non-transitory computer-readable recording medium.

BACKGROUND

Conventionally, a disk array controller is known to copy data stored in a storage apparatus that is predicted to malfunction among a plurality of storage apparatuses. The disk array controller copies the data in its surplus storage space that is created due to the plurality of storage apparatuses having different storage capacities. In a case where the storage apparatus predicted to malfunction actually malfunctions, a CPU (Central Processing Unit) of the disk array controller allows access for reading or writing data with respect to the surplus storage including the copied data when the malfunctioned storage apparatus is accessed for reading or writing data thereto.

Patent Document 1: Japanese Laid-open Patent Publication No. 2010-160623

However, the conventional disk array controller does not taking into consideration a case where the prediction of a malfunction is wrong. Therefore, a wrong prediction leads to a waste of resources in a case where the disk array controller has already copied data from a storage apparatus predicted to malfunction.

SUMMARY

According to an aspect of the present invention, there is provided a processing apparatus includes a precursor detection unit that detects a precursor event indicating a precursor that a target process cannot be executed by a process unit, and a control unit that sends a preparation request to a substitution processing apparatus when the precursor detection unit detects the precursor event in which the preparation request requests the substitution processing apparatus being a ready state for starting a substitution processing. The control unit sends a termination request to the substitution processing apparatus when a predetermined condition is satisfied after the control unit sends the preparation request, in which the termination request requests the substitution processing apparatus terminating the ready state.

The object and advantages of the invention will be realized and attained by means of the elements and combinations particularly pointed out in the claim.

It is to be understood that both the foregoing general description and the following detailed description are exemplary and explanatory and are not restrictive of the invention as claimed.

DESCRIPTION OF EMBODIMENTS

A processing apparatus, a process system, and a program according to embodiments of the present invention are described below with reference to the accompanying drawings.

<First embodiment>

First, a processing apparatus, a process system, and a program according to a first embodiment of the present invention is described with reference to the accompanying drawings.

<Overall configuration>

Figure 1:
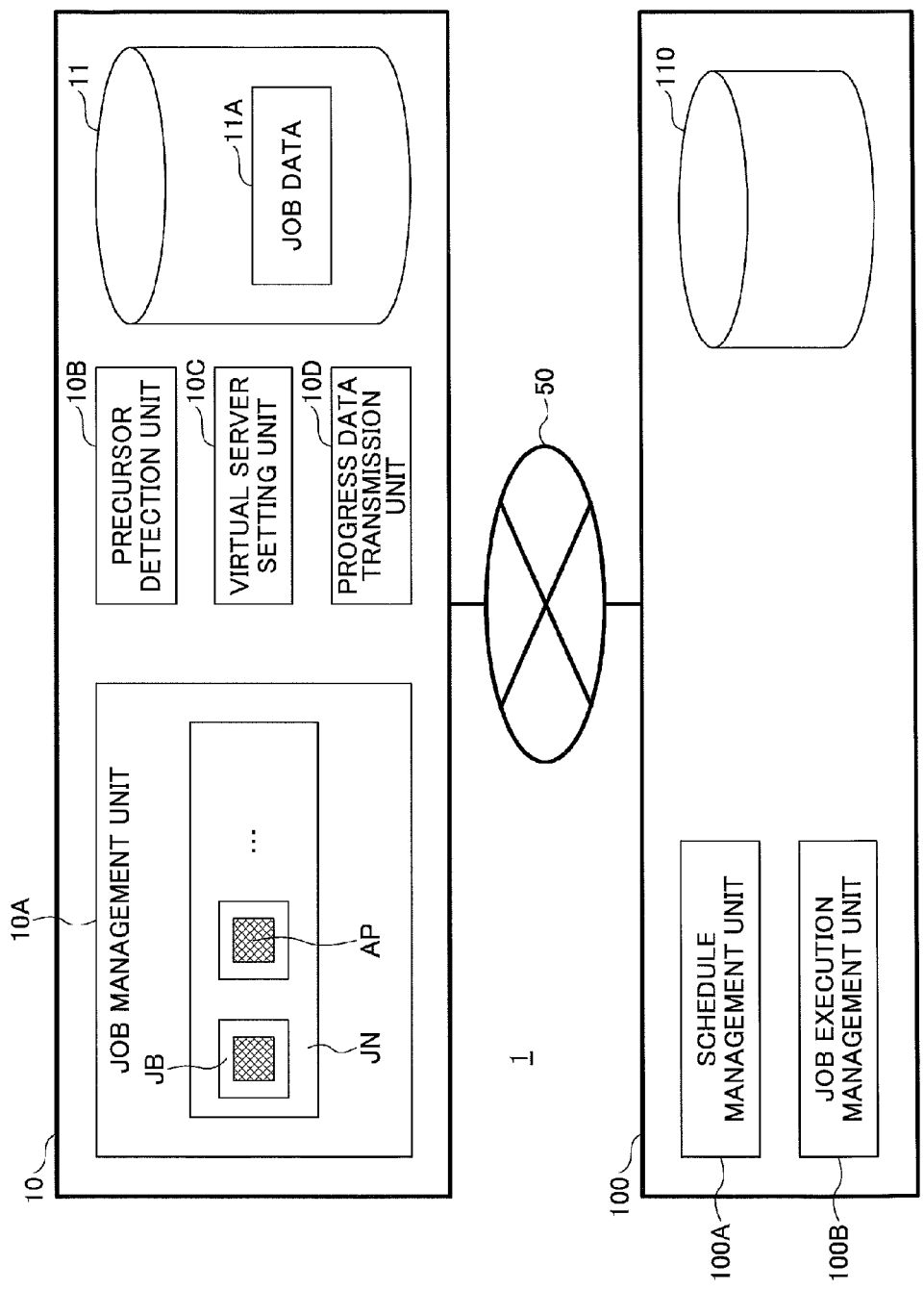
FIG. 1 illustrates an example of a system configuration of a process system according to the first embodiment of the present invention.

FIG. 1 illustrates an example of a system configuration of a process system 1 according to the first embodiment of the present invention. The process system 1 includes a server 10 and a server 100.

The server 10 performs voluntary processes according to a schedule such as a process of automatic operation of the system 1. The server 10 may also perform other processes. For example, the server 10 may be connected to a client computer via a LAN (Local Area Network), so that the server 10 can perform a process in response to a request from the client computer and provide the results of the process to the client computer. Further, the server 10 may perform a process in response to a request input from an input/output unit (not illustrated) by an operator.

The server 10 and the server 100 are connected to each other by a network 50 such as the Internet. The server 100 provides a cloud service to the server 10 and other devices connected to the network 50.

Figure 2:
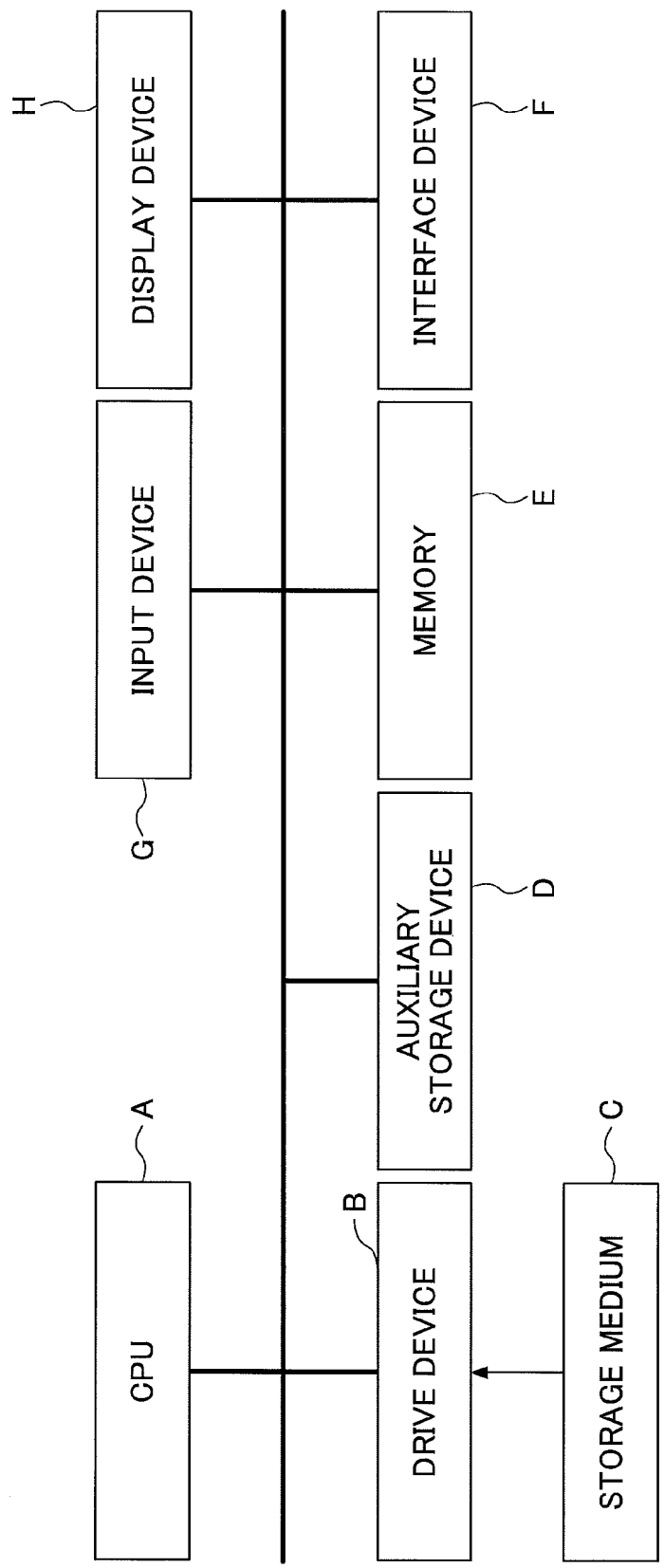
FIG. 2 illustrates an example of a hardware configuration of a server and a server according to an embodiment of the present invention.

FIG. 2 illustrates an example of a hardware configuration of the server 10 and the server 100. Each of the servers 10 and 100 includes, for example, a CPU A, a drive device B, an auxiliary storage device D, a memory E, an interface device F, an input device G, and a display device H. The elements included in the servers 10, 100 are connected to each other by a bus, a serial line or the like. Further, the servers 10, 100 may also include, for example, a timer (not illustrated), a DMA (Direct Memory Access) controller (not illustrated), and an interruption controller (not illustrated). In FIG. 1, the auxiliary storage device D and the memory E in each of the servers 10 and 100 are collectively indicated simply as a storage device 11 and a storage device 110, respectively.

The CPU A is a processor including, for example, a program counter, an instruction decoder, various arithmetic units, an LSU (Load Store Unit), and a general-purpose register. The drive device B is a device that can read a program or data from a storage medium C. When the storage medium C having a program recorded thereto is mounted in the drive device B, the program is installed from the storage medium C to the auxiliary storage device D via the drive device B. The storage medium C may be, for example, a portable-type storage medium such as a CD (Compact Disc), a DVD (Digital Versatile Disc), or a USB (Universal Serial Bus) memory. Further, the auxiliary storage device D may be, for example, a HDD (Hard Disk Drive) or a flash memory.

Other than installing a program from the storage medium C as described above, a program may be also be installed by having the interface device F download the program from another computer via a network and store the program in the auxiliary stored device D. The network may be, for example, the Internet, a LAN (Local Area Network), or a wireless network. Further, the program may be stored beforehand in the auxiliary storage device D or a ROM (Read-Only Memory) prior to the shipment of the server 10 or the server 100.

By executing the installed or pre-stored program with the CPU A, the data processing apparatus illustrated in FIG. 2 can function as the server 10 or the server 100 according to an embodiment of the present invention.

The memory E may be, for example, a RAM (Random Access Memory) or a EEPROM (Electrically Erasable and Programmable Read-Only Memory). The interface device F controls, for example, connections with the network.

The input device G may be, for example, a keyboard, a mouse, a button, a touchpad, a touch panel, or a microphone. Further, the display device H may be, for example, a LCD (Liquid Crystal Device) or a CRT (Cathode Ray Tube). Other than the display device H, the server 10 or the server 100 may also include other output devices such as a printer or a speaker.

The server 10 and the server 100 do not necessarily need to have the same hardware configurations. For example, an element may be deleted, replaced or added with respect to the hardware configuration of the server 10 or the server 100 illustrated in FIG. 2.

The server 10 includes functional units that are implemented by executing a program(s) with the CPU A. The functional units of the server 10 are a job management unit 10A, a precursor detection unit 10B, a virtual server setting unit 10C, and a progress data transmission unit 10D.

Further, the server 10 also includes a storage device 11 that functions as the auxiliary storage device D or the memory E illustrated in FIG. 2. The storage device 11 has job data 11A stored therein.

The server 100 also includes functional units that are implemented by executing a program(s). The functional units of the server 100 are a schedule management unit 100A and a job execution management unit 100B. Further, the server 100 also includes a storage device 110 that functions as the auxiliary storage device D or the memory E illustrated in FIG. 2.

The functional units (function blocks) of the servers 10, 100 do not necessarily need to be implemented by separate distinct programs but may be implemented as a sub-routine or a function that is called from a program. Further, apart of the functional units (function blocks) may be, for example, an LSI (Large Scale Integrated circuit), an IC (Integrated Circuit), or a FPGA (Field Programmable Gate Array).

The job management unit 10A may perform various data processes described above. The processes performed by the job management unit 10A are performed in units of job nets JN. The job net JN is a set (aggregate) of jobs JB that include an application program AP. The job JB is an object including the application program AP for processing an operation (service) such as a batch-file/shell script or a command. The job net JN is a set of one or more jobs JB that constitute a sequential flow. The job management unit 10A is not limited to performing various data processes. For example, the job management unit 10A may perform processes for data management.

<Precursor detection>

The precursor detection unit 10B detects a precursor event indicating a precursor of a failover that prevents the job management unit 10A from executing a process. The "event indicating a precursor of a failover" occurs when, for example, one of or a combination of the below-listed events occur. The precursor detection unit 10B determines (confirms) whether the below-listed events has occurred, for example, at a constant intervals. The determination of the precursor detection unit 10B may be performed at different intervals depending on each event.

<Events related to hardware>

Occurring of an abnormality of a cooling fan that cools the CPU A

Occurring of a degradation of the operation of the CPU A

Occurring of a failure of an electric power unit of the server 10

Occurring of an abnormality of an NIC (Network Interface Card) that serves as an interface between the network 50 or an abnormality of the local LAN or the network 50 for performing communications with a client computer Occurring of a high load of the network 50, the server 10, or the local LAN Occurring of a an abnormality of a disk (e.g., hanging-up of the I/O of a disk)

<Events related to software>

Cease of a resident process followed by rebooting

CPU usage rate surpassing a threshold for a long period

Shortage of memory

Detection of hanging up of an application program or an abnormality of a response of an application <Substitute Process Preparation Request>

Figure 3:
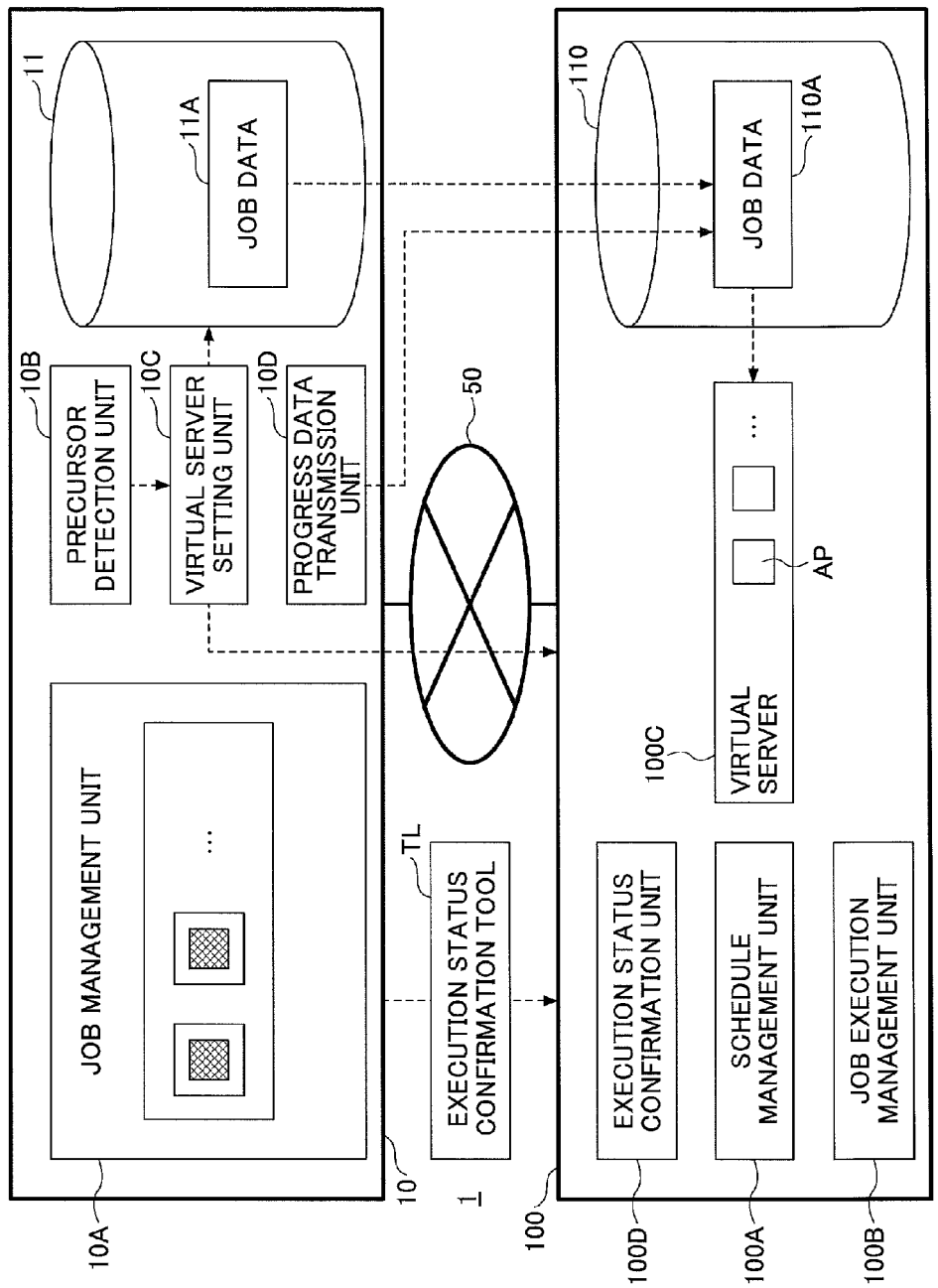
FIG. 3 is a schematic diagram illustrating a state where a substitute process preparation request is made according to an embodiment of the present invention.

When the precursor detection unit 10B detects the above-described event(s), the virtual server setting unit 10C sets a virtual server 100C in the server 100 and requests the server 100 to perform a similar process as the job management unit 10A. That is, the virtual server setting unit 10C requests the server 100 to become a ready state for starting a substitute process. This request is hereinafter referred to as "substitute process preparation request". FIG. 3 is a schematic diagram illustrating a state where the substitute process preparation request is made. The substitute process preparation request may be made by, for example, transmitting data complying with a predetermined format from the virtual server setting unit 10C to the server 100.

When making the substitute process preparation request, the virtual server setting unit 10C transfers job data 11A stored in the storage device 11 to the storage device 110 of the server 100. The job data 11A includes, for example, the name and IP address of the server 10, a job name, a job number (job ID), an application program or batch file included in a job, a job status, schedule data, and an execution history (process result) of a job.

Further, when making the substitute process preparation request, the virtual server setting unit 10C transmits an execution status confirmation tool TL to the server 100. The execution status confirmation tool TL is software for confirming an execution status of the job management unit 10A.

The schedule management unit 100A and the job execution management unit 100B of the server 100 sets the virtual server 100C based on the job data 110A transferred to the storage device 110. Further, the job status, the schedule data, and the execution history of a job transferred to the storage device 110 are input as process parameters of the schedule management unit 100A and the job execution management unit 100B. Thereby, the virtual server 100C becomes a state ready for starting a similar process as the job management unit 10A. That is, the virtual server 100C becomes a ready state for starting a substitute process.

<Progress data transmission>

When the virtual server setting unit 10C makes (sends) the substitute process preparation request, the progress data transmission unit 10D transmits progress data to the server 100, for example, at predetermined cycles. The progress data changes in correspondence with the progress of a job(s) executed by the job management unit 10A. The progress data transmitted by the progress data transmission unit 10D includes data indicating, for example, the job status, the job schedule, and the execution history of a job. Thereby, the data transferred to the storage device 110 is rewritten with the latest data, i.e., the data transmitted by the progress data transmission unit 10D.

Owing to the above-described processes, even in a case where a job executed by the job management unit 10A progresses and the status of the job or the like changes after the substitute process preparation request is made, the virtual server 100C can start a substitute process by using the latest status data without having to freshly obtain status data. That is, in a case of actually performing the substitute process, the virtual server 100C can determine where to start the process. Therefore, the virtual server 100C can maintain a ready state for starting the substitute process after the substitute process preparation request is made.

<Execution status confirmation>

The OS (Operating System) of the server 100 may execute the execution status confirmation tool received from the server 10 to implement the execution status confirmation unit 100D.

In order to confirm the execution status of the job management unit 10A, the execution status confirmation unit 100D transmits an execution status confirmation command (check process) to the server 10, for example, at predetermined cycles.

Figure 4:
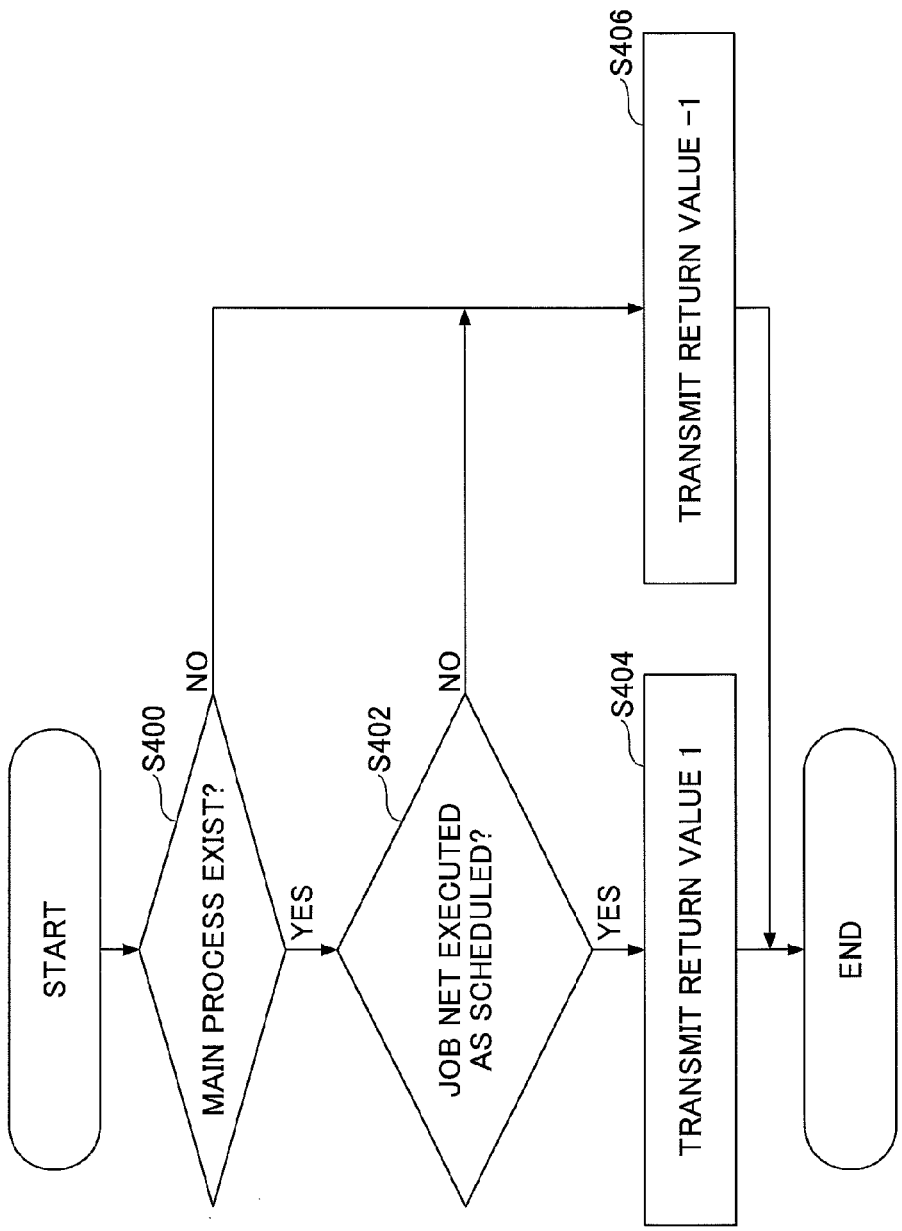
FIG. 4 is a flowchart illustrating an example of the flow of processes performed by a server according to an embodiment of the present invention.

When the server 10 receives the execution status confirmation command, the server 10 executes an instruction written in the execution status confirmation command. FIG. 4 is a flowchart illustrating an example of the flow of processes performed by the server 10.

The server 10 determines the existence of a "main process" required for operating the job management unit 10A (Step S400).

In a case where the "main process" required for operating the job management unit 10A exists (Yes in Step S400), the server 10 determines whether the job net JN operating in the job management unit 10A is being executed as scheduled (Step S402).

In a case where the "main process" exists and the job net JN is being executed as scheduled (Yes in Step S402), the server 10 transmits a return value "1" to the server 100 in response to the execution status confirmation command (Step S404).

In a case where the "main process" does not exist or where the job net JN is not being executed as scheduled (No in Steps S400, S402), the server 10 transmits a return value "−1" to the server 100 in response to the execution status confirmation command (Step S406).

<Start of substitute process>

Figure 5:
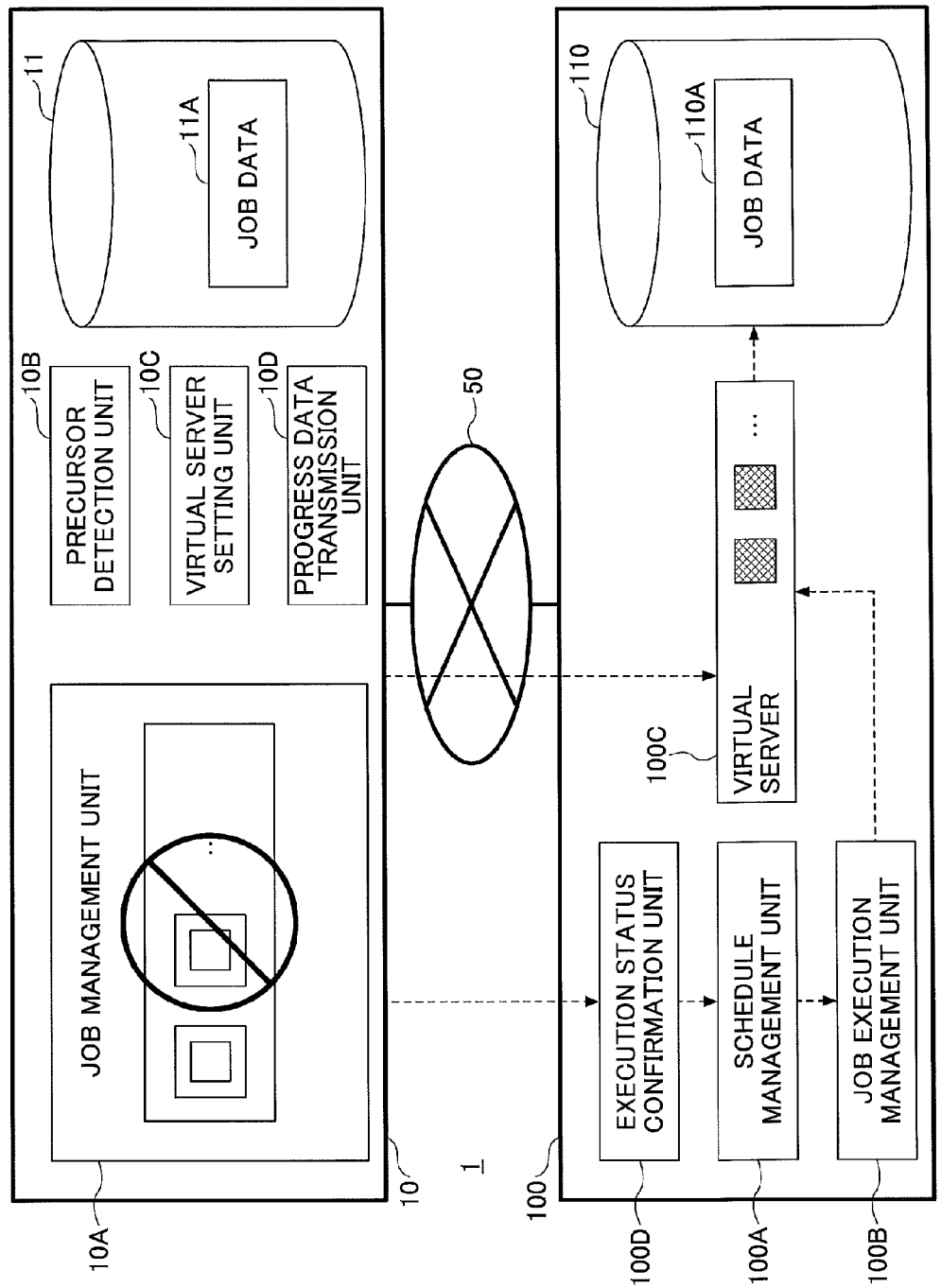
FIG. 5 is a schematic diagram illustrating a state where a substitute process has been started according to an embodiment of the present invention.

When the server 100 receives the return value "−1" from the server 10, the execution status confirmation unit 100D determines that a failover (preventing the job management unit 10A from executing a process) has occurred and instructs the virtual server 100C to start the substitute process. For example, the execution status confirmation unit 100D notifies the schedule management unit 100A that the failover has occurred. Then, the schedule management unit 100A notifies the job execution management unit 100B that the failover has occurred. Then, the job execution management unit 100B instructs the virtual server 100C to execute an application program. For example, the virtual server 100C obtains data input to the job management unit 10A from the server 10 and performs a process similar to a process performed by the job management unit 10A. Then, the virtual server 100C stores a result of the process in the storage device 110. The process results is, for example, added to a portion of the job data 110A. FIG. 5 is a schematic diagram illustrating a state where the substitute process has been started.

<Recovery process>

Even after the substitute process is started, the execution status confirmation unit 100D transmits the execution status confirmation command to the server 10, for example, at predetermined cycles. Then, in a case where the execution status confirmation unit 100D receives a return value "1" from the server 10, the execution status confirmation unit 100D notifies, for example, the schedule management unit 100A that the job management unit 10A can recover. Then, the schedule management unit 100A notifies the job execution management unit 100B that the job management unit 10A can recover. Then, the job execution management unit 100B instructs the virtual server 100C to stop executing the application program. In response to the instruction from the job execution management unit 10A, the virtual server 100C transfers the job data 110A stored in the storage device 110 to the storage device 11 of the server 10. The job data 110A transferred to the storage device 11 of the server 10 includes the process results of the virtual server 100C. Accordingly, because the execution of the application program by the virtual server 100C is stopped in response to the recovery of the job management unit 10A, the waste of resources caused by unnecessary operation of the virtual server 100C can be prevented.

Figure 6:
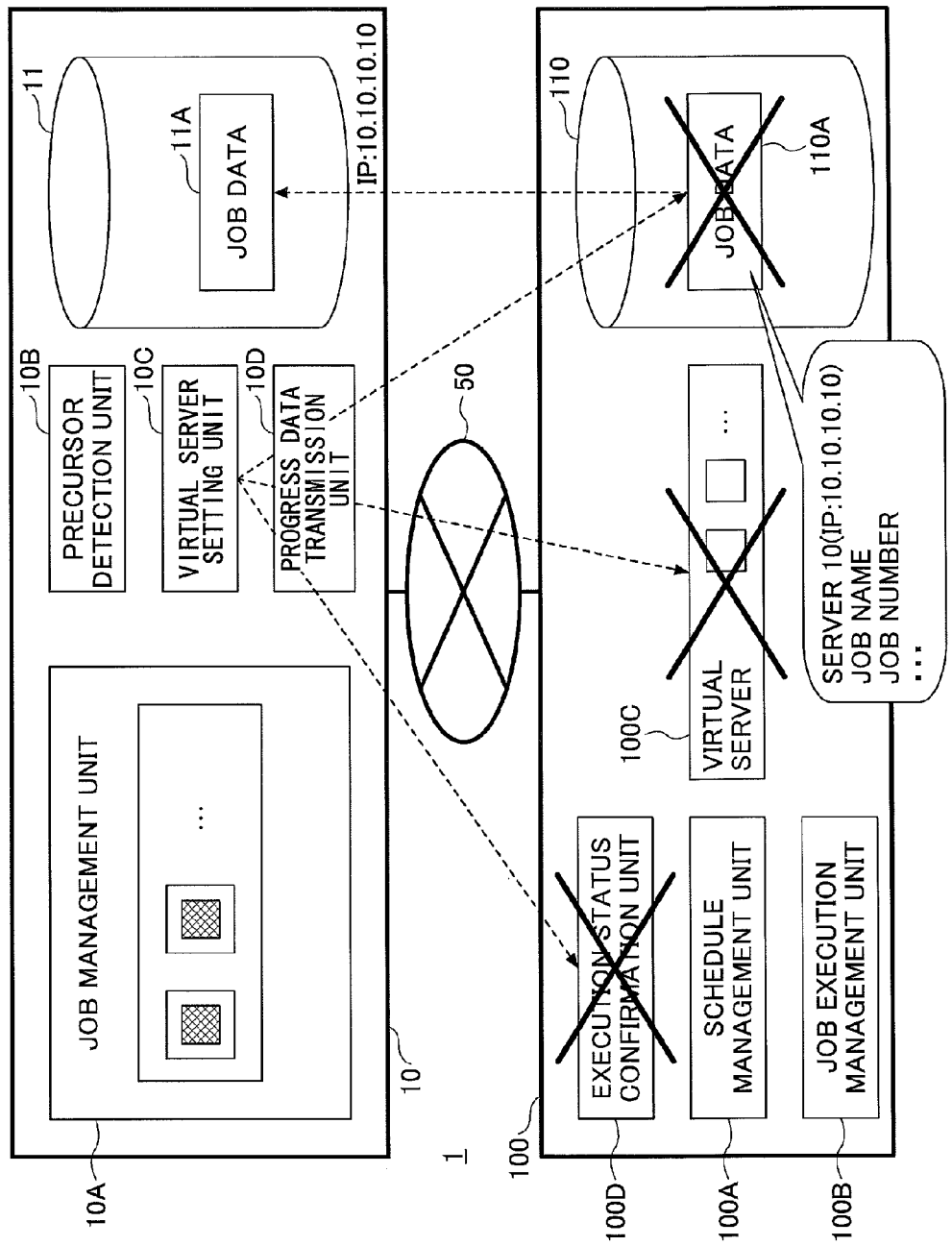
FIG. 6 is a schematic diagram illustrating a state where a job management unit has recovered from the state illustrated in FIG. 5.

When the above-described processes are completed, the virtual server setting unit 10C of the server 10 may, for example, request the server 100 to delete the virtual server 100C, the execution status confirmation unit 110D, and the job data 110A. This request is hereinafter referred to as a "deletion request". FIG. 6 is a schematic diagram illustrating a state where the job management unit 10A has recovered from the state illustrated in FIG. 5.

<Substitute process preparation termination request>

As described above, in a case where a failover actually occurs after requesting the preparation for the substitute process, the virtual server 100C starts to execute the substitute process. Then, when it is determined that the job management unit 10A can recover after the execution of the substitute process is started, the virtual server 100C stops the execution of the application program.

The following describes a case where a failover does not actually occur after requesting the preparation for the substitute process. In the case where the failover does not actually occur after requesting the preparation for the substitute process, the virtual server setting unit 10C requests the server 100 to terminate the ready state for starting the substitute process. This request is hereinafter referred to as a "substitute process preparation termination request".

In a case where a predetermined condition is satisfied after making the substitute process preparation request, the virtual server setting unit 10C requests the server 100 to terminate the ready state for starting the substitute process. The predetermined condition is, for example, a condition in which a predetermined period from the substitute process preparation request has elapsed without the occurrence of a failover of the job management unit 10A. For example, the virtual server setting unit 10C may start counting time from the substitute process preparation request by using a timer. Then, when a predetermined period (e.g., approximately 30 min.) has elapsed after starting to count the time with the timer, the virtual server setting unit 10C makes the substitute process preparation termination request. The predetermined period may be set with a default value and changed by the user.

Figure 7:
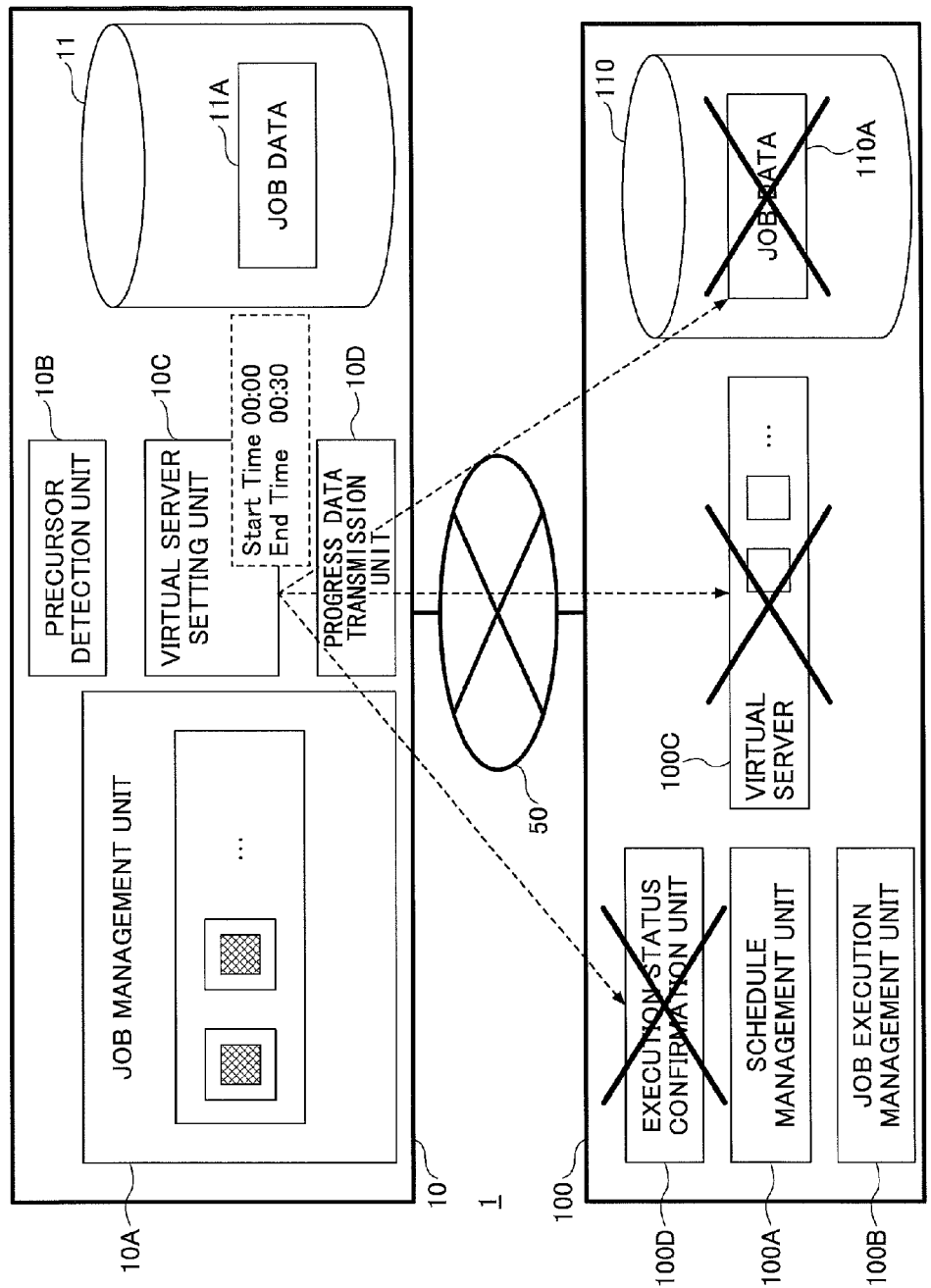
FIG. 7 is a schematic diagram illustrating a state where a predetermined period has elapsed without the occurrence of a failover of a job management unit according to an embodiment of the present invention.

The substitute process preparation termination request may include requesting the virtual server 100C to stop. Alternatively, the substitute process preparation termination request may include requesting the server 100 to delete the virtual server 100C, the execution status confirmation unit 100D, and the job data 110A. FIG. 7 is a schematic diagram illustrating a state where the predetermined period has elapsed without the occurrence of a failover of the job management unit 10A.

By the above-described processes, the server 10 can prevent resources for maintaining the ready state from being wasted.

Further, because the server 100 is a server for providing a cloud service, typically, a fee is charged (accounted) in correspondence with the period (length of time) in which the virtual server 100C is set (provided). Therefore, because the server 10 requests the deletion of the virtual server 100C in a case where the predetermined period elapses without the occurrence of the failover after the substitute process preparation request is made, the charge amount can be reduced in comparison with a case where the virtual server 100C continues to exist (including a state where the virtual server 100C is stopped) even after the predetermined period has elapsed. Further, even in a case where the cloud service or the like is provided free of charge by the server 100 or run by the same entity (e.g., carrier) as the server 100, the memory capacity of the server 100 or the power consumption of the server 100 can be reduced. Therefore, the operating cost of the server 100 can be reduced.

In a case where the virtual server 100C is set at the timing of the occurrence of a failover instead of the timing of the detection of the event indicating the precursor, costs may be further reduced compared to the above-described embodiment of the present invention. In such a case, however, the server 100 may be unable to promptly start the substitute process. This is because a process of copying the job data 11A to the storage device 110 of the server 100 and a process of generating the virtual server 100C based on the job data 110A are required for transferring a process from the server 10 to the server 100 in a cloud environment. That is, the process of copying the job data 11A and the process of generating the virtual server 100C may require a relatively longtime depending on the cloud environment. Thus, in a case where the job net to be executed by the job management unit 10A is desired to be provided at real time, practicability may be degraded depending on the time required for transferring a process from the server 10 to the server 100. Therefore, with the above-described embodiment of the present invention, the server 100 can promptly start the substitute process by setting the virtual server 100c at the timing of the detection of the event indicating the precursor.

<Flowchart>

Figure 8:
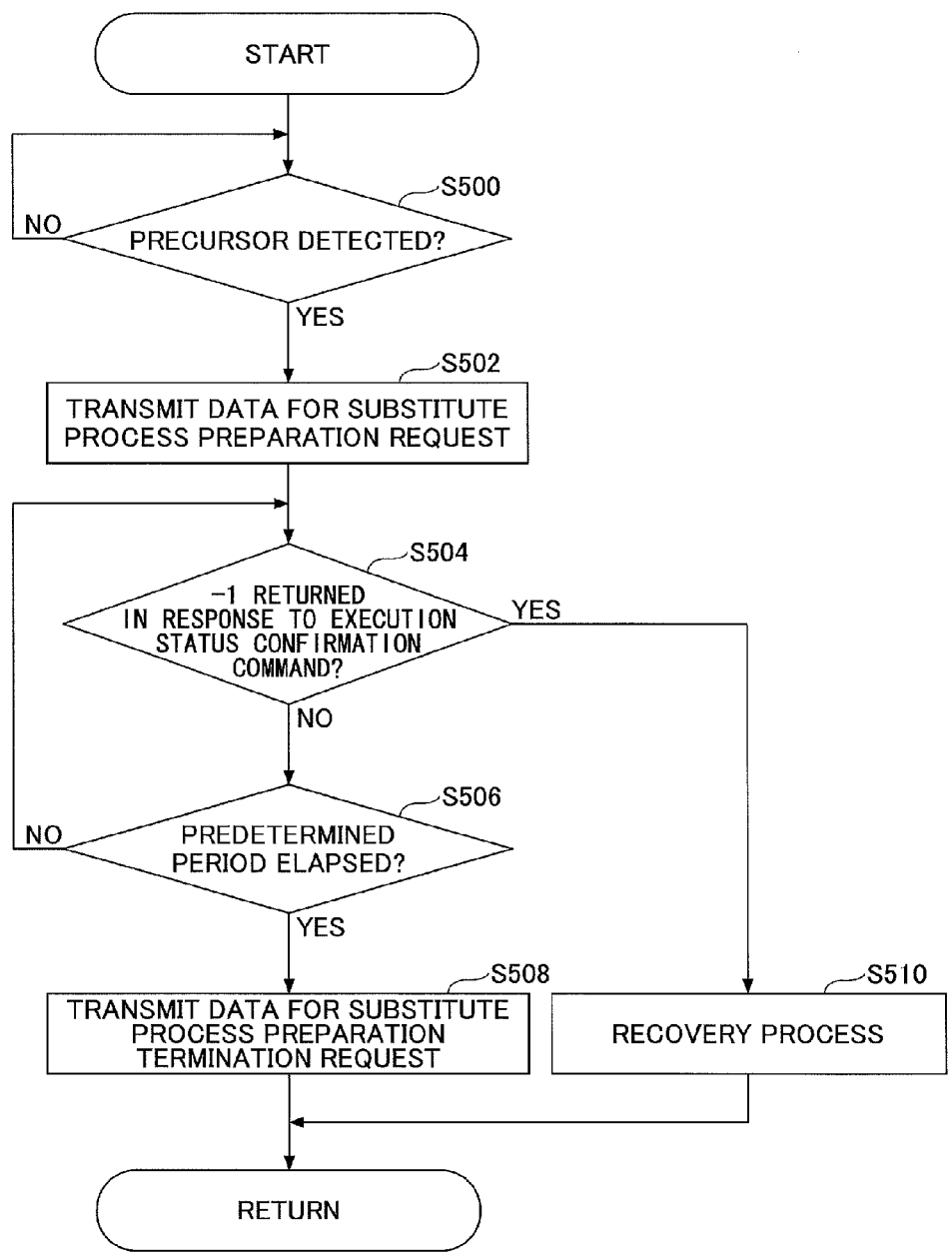
FIG. 8 is a flowchart illustrating an example of the flow of processes executed by a virtual server setting unit of a server according to the first embodiment.

FIG. 8 is a flowchart illustrating an example of the flow of processes executed by the virtual server setting unit 10C of the server 10 according to the first embodiment. The flowchart of FIG. 8 may be repeatedly executed, for example, at predetermined cycles.

First, the virtual server setting unit 10C waits (stands by) until the precursor detection unit 10B detects an event indicating a precursor of a failover (Step S500).

When the precursor detection unit 10B detects an event indicating a precursor of a failover (Yes in Step S500), the virtual server setting unit 10C transmits data for the substitute process preparation request to the server 100 (Step S502).

Then, the virtual server setting unit 10C determines whether a return value "−1" is returned from the server 100 in response to the execution status confirmation command (Step S504).

In a case where the return value "−1" is not returned from the server 100 in response to the execution status confirmation command (No in Step S504), the virtual server setting unit 10C determines whether a predetermined period has elapsed from the transmission of the data for the substitute process preparation request (Step S506). When the predetermined period has not elapsed from the transmission of the data for the substitute process preparation request (No in Step S506), the virtual server setting unit 10C returns to the determination process of Step S504.

When the predetermined period has elapsed from the transmission of the data for the substitute process preparation request (Yes in Step S506), the virtual server setting unit 10C transmits data for the substitute process preparation termination request to the server 100 (Step S508). Thereby, one routine of the flowchart of FIG. 8 is completed.

On the other hand, in a case where the return value "−1" is returned from the server 100 in response to the execution status confirmation command (Yes in Step S504), the virtual server setting unit 10C instructs the job management unit 10A to perform the recovery process (Step S510). Thereby, one routine of the flowchart of FIG. 8 is completed.

Figure 9:
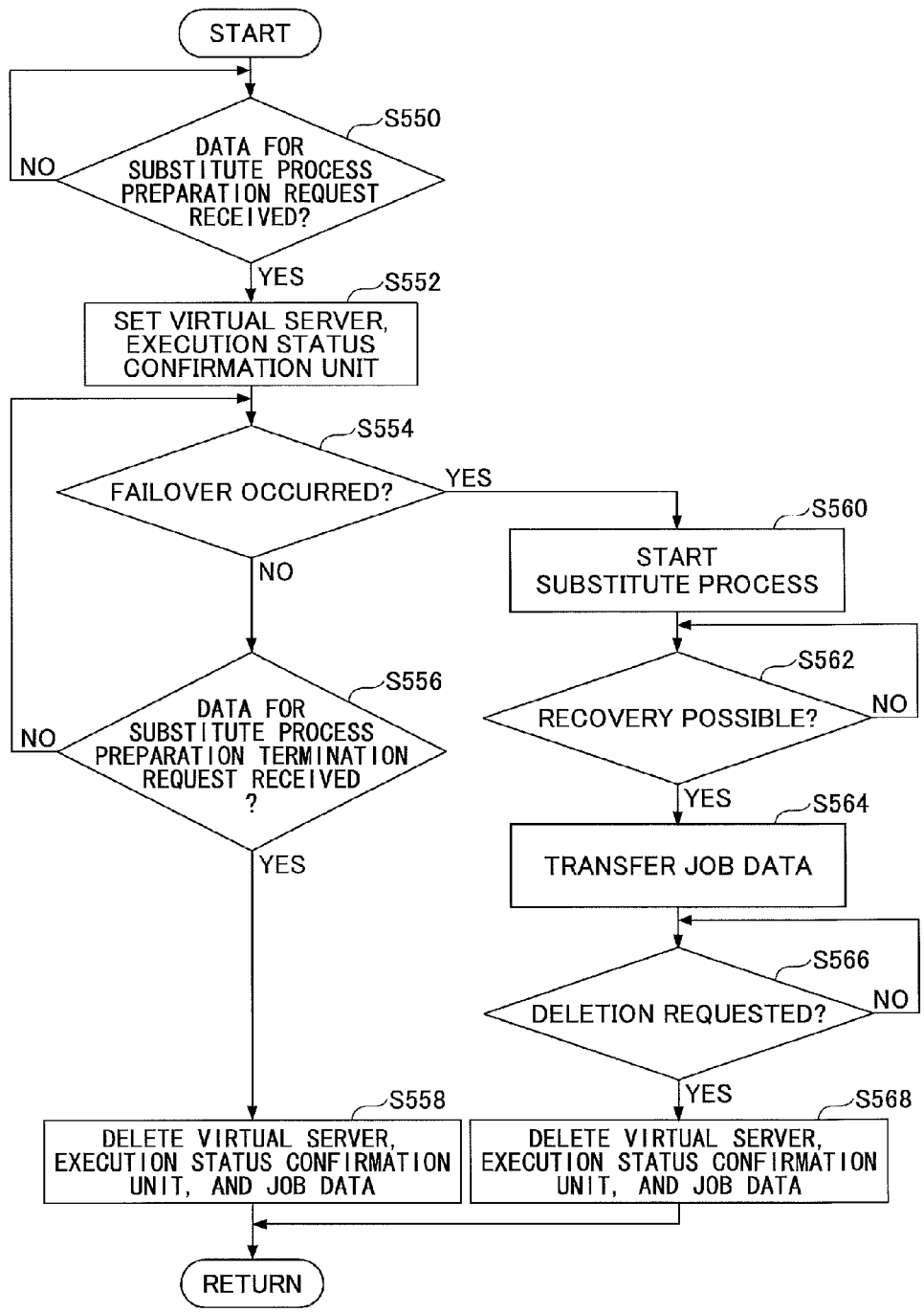
FIG. 9 is a flowchart illustrating an example of the flow of processes executed by a server according to the first embodiment.

FIG. 9 is a flowchart illustrating an example of the flow of processes executed by the server 100 according to the first embodiment. The flowchart of FIG. 9 may be repeatedly executed, for example, at predetermined cycles.

First, the server 100 waits until receiving data for the substitute process preparation request (Step S550).

When the server 100 receives the data for the substitute process preparation request (Yes in Step S550), the server 100 sets the virtual server 100C and the execution status confirmation unit 100D (Step S552).

Then, the execution status confirmation unit 100D determines whether a failover of the job management unit 10A has occurred (Step S554).

In a case where a failover has not occurred (No in Step S554), the server 100 determines whether data for the substitute process preparation termination request has been received (Step S556). In a case where the server 100 has not received the data for the substitute process preparation termination request (No in Step S556), the server 100 returns to the determination process of the execution status confirmation unit 100D in Step S554.

When the data for the substitute process preparation termination request is received (Yes in Step S556), the server 100 deletes the virtual server 100C, the execution status confirmation unit 100D, and the job data 110A (Step S558). Thereby, one routine of the flowchart of FIG. 9 is completed.

On the other hand, in a case where a failover of the job management unit 10A has occurred (Yes in Step S554), the server 100 starts the substitute process (Step S560).

When the substitute process is started, the execution status confirmation unit 100D of the server 100 determines whether the job management unit 10A can recover (Step S562). As described above, this determination is performed by referring to the return value of the execution status confirmation command. In a case where the job management unit 10A cannot recover (Step S562), the execution status confirmation unit 100D repeatedly executes the determination in cycles.

When the execution status confirmation unit 100D determines that the job management unit 10A can recover (Yes in Step S562), the virtual server 100C of the server 100 transfers the job data 110A to the storage device 11 of the server 10 (Step S564).

Then, the server 100 waits until receiving data for the deletion request (Step S566). When the server 100 receives the data for the deletion request (Yes in Step S566), the server 100 deletes the virtual server 100C, the execution status confirmation unit 100D, and the job data 110A (Step S568). Thereby, one routine of the flowchart of FIG. 9 is completed.

<Conclusion>

With the processing apparatus, the process system, and the program according to the above-described first embodiment, resources can be prevented from being wasted owing to the substitute process preparation termination request that is made when a predetermined period elapses from the time of the making the substitute process preparation request in a case where a failover does not occur.

Further, with the processing apparatus, the process system, and the program according to the above-described first embodiment, the ready state for starting the substitute process can be maintained owing to the progress data that changes in correspondence with the execution progress of a job after the substitute process preparation request is made.

It is to be noted that, in the claims, the job management unit 10A corresponds to, for example, a process unit, the virtual server setting unit 10C corresponds to, for example, a control unit, the server 10 corresponds to, for example, a processing apparatus, and the server 100 corresponds to, for example, a substitution processing apparatus.

<Second embodiment>

First, a processing apparatus, a process system, and a program according to a second embodiment of the present invention is described with reference to the accompanying drawings.

<Overall configuration>

Figure 10:
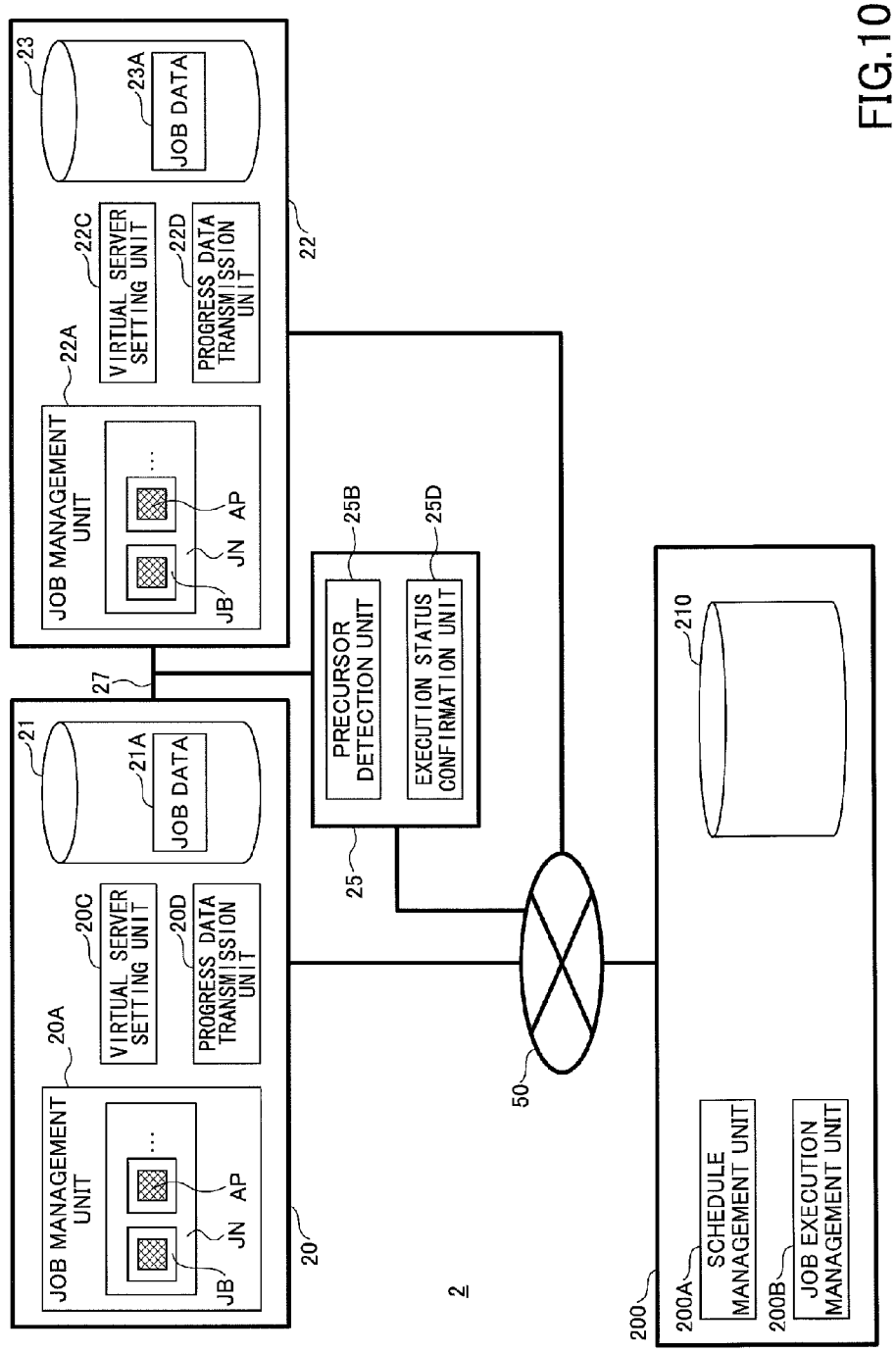
FIG. 10 illustrates an example of a system configuration of a process system according to the second embodiment of the present invention.

FIG. 10 illustrates an example of a system configuration of a process system 2 according to the second embodiment of the present invention. The process system 2 includes servers 20, 22, 25, and 200.

The servers 20, 22 perform voluntary processes according to a schedule such as a process of automatic operation of the system 2. The servers 20, 22 may also perform other processes. For example, the servers 20, 22 may be connected to a client computer via a LAN (Local Area Network), so that the servers 20, 22 can perform a process in response to a request from the client computer and provide the results of the process to the client computer. Further, the servers 20, 22 may perform a process in response to a request input from an input/output unit (not illustrated) by an operator.

The server 20 and the server 22 are connected to each other by, for example, a communication line 27. The server 25 that is connected to the communication line 27 monitors the servers 20, 22 as described below.

The number of servers to be monitored by the server 25 could be any number and is not limited to two servers as illustrated in FIG. 10.

The servers 20, 22, 25, and 200 are connected to each other by a network 50 such as the Internet. The server 200 provides a cloud service to the servers 20, 22, 25 and other devices connected to the network 50.

In this embodiment, because the hardware configurations of the servers 20, 22, 25, and 200 are substantially the same as those of, for example, the server 10 of the first embodiment, the hardware configurations of the servers 20, 22, 25, and 200 can be referred in FIG. 2. Thus, further description the hardware configurations of the servers 20, 22, 25, and 200 are omitted.

The server 20 includes functional units that are implemented by executing a program(s) with the CPU A. The functional units of the server 20 are a job management unit 20A, a virtual server setting unit 20C, and a progress data transmission unit 20D. Similarly, the server 22 includes functional units that are implemented by executing a program(s) with the CPU A. The functional units of the server 22 are a job management unit 22A, a virtual server setting unit 22C, and a progress data transmission unit 22D.

The server 25 includes functional units that are implemented by executing a program(s) with the CPU A. The functional units of the server 25 are a precursor detection unit 25B and a progress data transmission unit 25D.

Further, the server 20 also includes a storage device 21 that functions as the auxiliary storage device D or the memory E. The storage device 21 has job data 21A stored therein. The server 23 also includes a storage device 23 that functions as the auxiliary storage device D or the memory E. The storage device 23 has job data 23A stored therein.

The server 200 also includes functional units that are implemented by executing a program(s). The functional units of the server 200 are a schedule management unit 200A and a job execution management unit 200B. Further, the server 200 also includes a storage device 210 that functions as the auxiliary storage device D or the memory E.

The functional units (function blocks) of the servers 20, 22, 25, and 200 do not necessarily need to be implemented by separate distinct programs but may be implemented as a sub-routine or a function that is called from a program. Further, a part of the functional units (function blocks) may be, for example, an LSI, an IC, or a FPGA.

The job management units 20A, 22A may perform various data processes described above. The processes performed by the job management units 20A, 20B are performed in units of job nets JN. The job net JN is a set (aggregate) of jobs JB that include an application program AP. The job JB is an object including the application program AP for processing an operation (service) such as a batch-file/shell script or a command. The job net JN is a set of one or more jobs JB that constitute a sequential flow. The job management units 20A, 22A are not limited to performing various data processes. For example, the job management units 20A, 22A may perform processes for data management.

<Precursor detection>

In this embodiment, the server 25 monitors failovers pertaining to the servers 20 and 22. The precursor detection unit 25B of the server 25 detects an event indicating a precursor of a failover. Because the "event indicating a precursor of a failover" is substantially the same as that of the first embodiment, further description thereof is omitted. The precursor detection unit 25B determines (confirms) whether the event indicating a precursor of a failover has occurred, for example, at a constant intervals. The determination of the precursor detection unit 25B may be performed at different intervals depending on each event.

When the precursor detection unit 25B detects an event indicating a precursor of a failover pertaining to the server 20, the precursor detection unit 25B transmits a precursor detection signal to the server 20 to notify the detection of the event. Further, when the precursor detection unit 25B detects an event indicating a precursor of a failover pertaining to the server 22, the precursor detection unit 25B transmits a precursor detection signal to the server 22 to notify the detection of the event.

It is to be noted that, although the process system of this embodiment is described with an example where one server monitors multiple servers in a batch, the monitoring may be performed cyclically. For example, in a case where there are servers A, B, and C, the server A may monitor the server B, the server B may monitor the server C, and the server C may monitor the server A. Alternatively, the monitoring may be performed mutually in which, for example, a pair of servers monitors each other.

<Substitute process preparation request>

When the server 20 receives the precursor detection signal, the virtual server setting unit 20C of the server 20 sets a virtual server 200Ca in the server 200 and requests the server 200 to perform a similar process as the job management unit 20A. That is, the virtual server setting unit 20C requests the server 200 to become a ready state for starting a substitute process.

Figure 11:
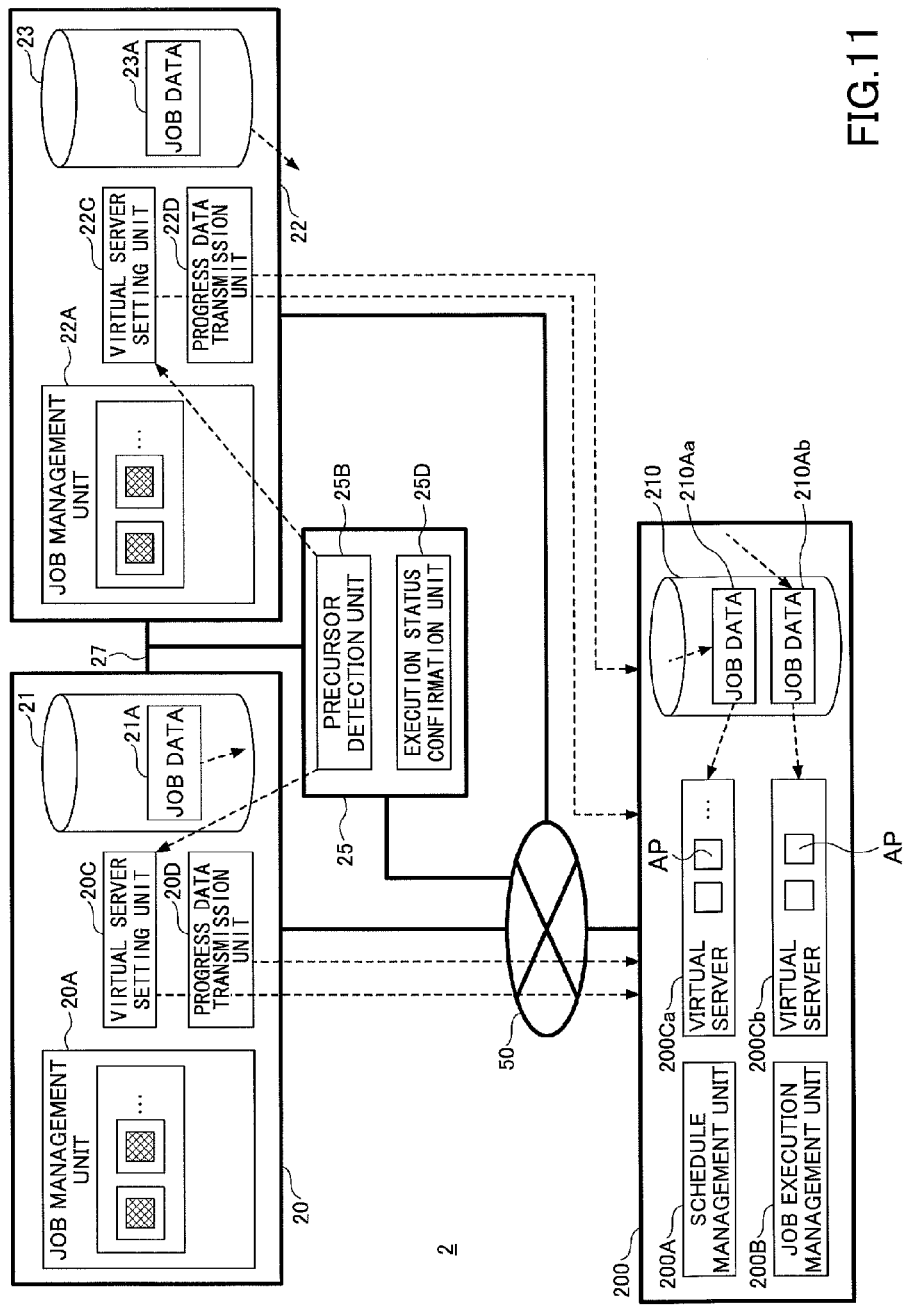
FIG. 11 is a schematic diagram illustrating a state where substitute process preparation requests are made by a virtual server setting units according to an embodiment of the present invention.

When the server 22 receives the precursor detection signal, the virtual server setting unit 22C of the server 22 sets a virtual server 200Cb in the server 200 and requests the server 200 to perform a similar process as the job management unit 22A. That is, the virtual server setting unit 22C requests the server 200 to become a ready state for starting a substitute process. These requests by the virtual server setting units 20C, 22C are hereinafter referred to as "substitute process preparation requests". FIG. 11 is a schematic diagram illustrating a state where the substitute process preparation requests are made by the virtual server setting units 20C, 22C. The substitute process preparation requests may be made by, for example, transmitting data complying with predetermined formats from the virtual server setting units 20C, 22C to the server 200.

When making the substitute process preparation request, the virtual server setting unit 20C transfers job data 21A stored in the storage device 21 to the storage device 210 of the server 200. The job data 21A includes, for example, the name and IP address of the server 20, a job name, a job number (job ID), an application program or batch file included in a job, a job status, schedule data, and an execution history (process result) of a job.

Similarly, when making the substitute process preparation request, the virtual server setting unit 22C transfers job data 23A stored in the storage device 23 to the storage device 210 of the server 200. The job data 23A includes, for example, the name and IP address of the server 20, a job name, a job number (job ID), an application program or batch file included in a job, a job status, schedule data, and an execution history (process result) of a job.

The schedule management unit 200A and the job execution management unit 200B of the server 200 sets a virtual server with respect to each server that has made the substitute process preparation request. That is, the schedule management unit 200A and the job execution management unit 200B of the server 200 sets a virtual server 200Ca based on the job data 210Aa transferred to the storage device 210 from the virtual server setting unit 20C. Similarly, the schedule management unit 200A and the job execution management unit 200B of the server 200 sets a virtual server 200Cb based on the job data 210Ab transferred to the storage device 210 from the virtual server setting unit 22C.

Further, the job status, the schedule data, and the execution history of a job transferred to the storage device 210 are input as process parameters of the schedule management unit 200A and the job execution management unit 200B. Thereby, the virtual servers 200Ca, 200Cb become a state ready for starting a similar process as the job management units 20A, 22A. That is, the virtual servers 200Ca, 200Cb become a ready state for starting a substitute process.

<Progress data transmission>

When the virtual server setting unit 20C makes the substitute process preparation request, the progress data transmission unit 20D transmits progress data to the server 200, for example, at predetermined cycles. The progress data changes in correspondence with the progress of a job(s) executed by the job management unit 20A. The progress data transmitted by the progress data transmission unit 20D includes data indicating, for example, the job status, the job schedule, and the execution history of a job. Thereby, the data transferred to the storage device 210 is rewritten with the latest data, i.e., the data transmitted by the progress data transmission unit 20D.

Similarly, when the virtual server setting unit 22C makes the substitute process preparation request, the progress data transmission unit 22D transmits progress data to the server 200, for example, at predetermined cycles. The progress data changes in correspondence with the progress of a job(s) executed by the job management unit 22A. The progress data transmitted by the progress data transmission unit 22D includes data indicating, for example, the job status, the job schedule, and the execution history of a job. Thereby, the data transferred to the storage device 210 is rewritten with the latest data, i.e., the data transmitted by the progress data transmission unit 22D.

Owing to the above-described processes, even in a case where a job executed by the job management unit 20A progresses and the status of the job or the like changes after the substitute process preparation request is made, the virtual server 200Ca can start a substitute process by using the latest status data without having to freshly obtain status data. Similarly, owing to the above-described processes, even in a case where a job executed by the job management unit 22A progresses and the status of the job or the like changes after the substitute process preparation request is made, the virtual server 200Cb can start a substitute process by using the latest status data without having to freshly obtain status data. That is, in a case of actually performing the substitute process, the virtual servers 200Ca, 200Cb can determine where to start the process. Therefore, the virtual servers 200Ca, 200Cb can maintain a ready state for starting the substitute process after the substitute process preparation requests are made.

<Execution status confirmation>

In order to confirm the execution status of the job management units 20A, 22B, the execution status confirmation unit 250D of the server 25 transmits an execution status confirmation command (check process) to the servers 20, 22, for example, at predetermined cycles. The execution status confirmation command is transmitted to a server from which an event indicating a precursor of a failover is detected.

When the servers 20, 22 receive the execution status confirmation command, the servers 20, 22 executes an instruction written in the execution status confirmation command. Because the flow of processes performed in response to the execution status confirmation command is substantially the same as that of the first embodiment illustrated in FIG. 4, further description of the flow is omitted. A return value of the execution status confirmation command is returned to the execution status confirmation unit 25D of the server 25 in response to the execution status confirmation command.

<Start of substitute process>

Figure 12:
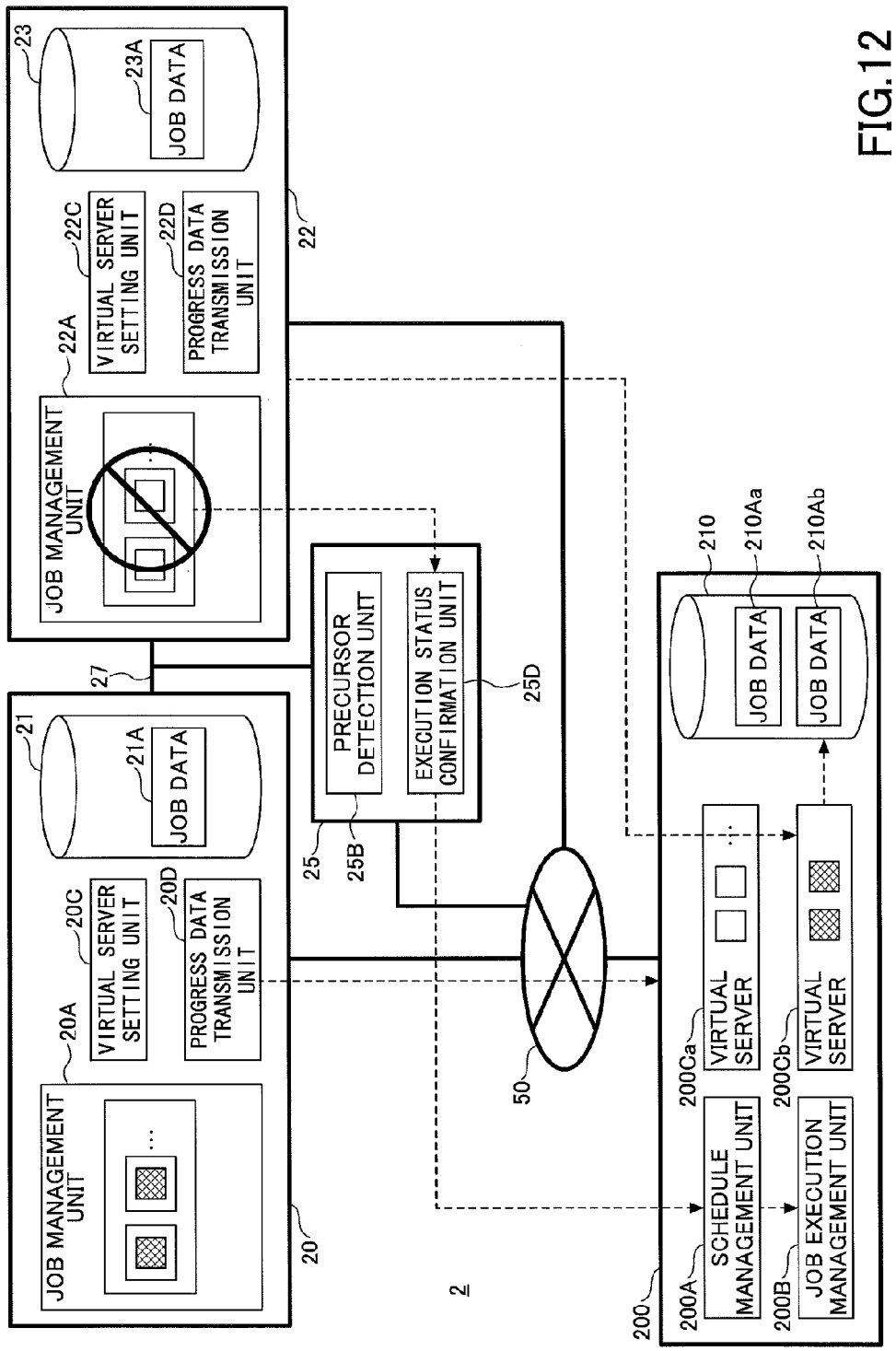
FIG. 12 is a schematic diagram illustrating a state where a substitute process of a job management unit has been started according to an embodiment of the present invention.

When the execution status confirmation unit 25D receives the return value "−1" from the server 20 or the server 22, the execution status confirmation unit 25D determines that a failover (preventing the job management unit 20A or 20B from executing a process) has occurred and instructs the server 200 to start the substitute process. For example, the execution status confirmation unit 25D notifies the schedule management unit 200A that the failover has occurred in a corresponding server. Although the following example describes a case where the failover has occurred in the job management unit 22A of the server 22, the same applies to a case where the failover has occurred in the job management unit 20A of the server 20. Then, the schedule management unit 200A notifies the job execution management unit 200B that the failover has occurred in the job management unit 22A of the server 22. Then, the job execution management unit 200B instructs the virtual server 200Cb to execute an application program. For example, the virtual server 200Cb obtains data input to the job management unit 22A from the server 22 and performs a process similar to a process performed by the job management unit 22A. Then, the virtual server 200Cb stores a result of the process in the storage device 210. The process results is, for example, added to a portion of the job data 210Ab. FIG. 12 is a schematic diagram illustrating a state where the substitute process of the job management unit 22A has been started.

<Recovery process>

Figure 13:
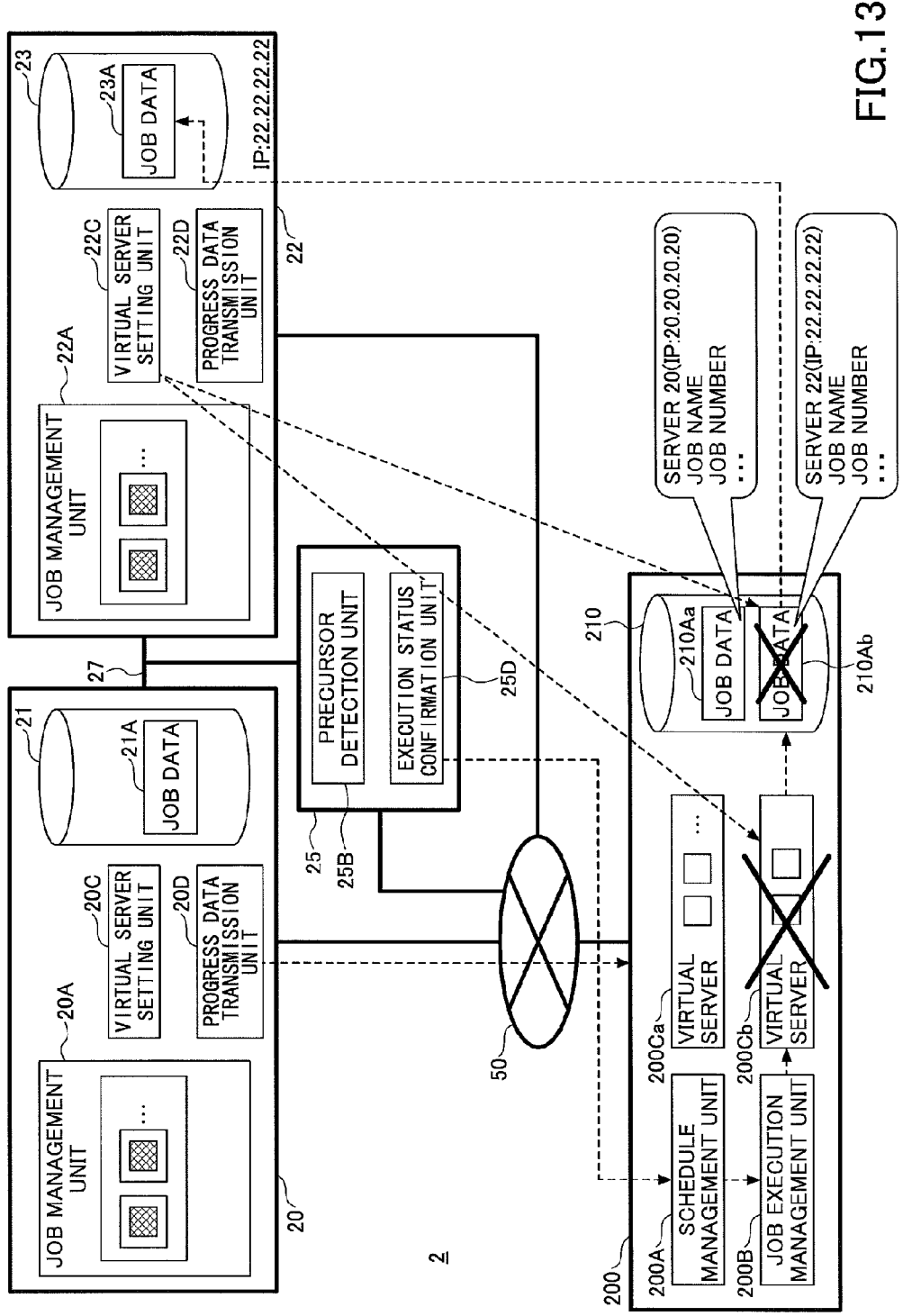
FIG. 13 is a schematic diagram illustrating a state where a job management unit has recovered from the state illustrated in FIG. 12.

Even after the substitute process is started, the execution status confirmation unit 25D transmits the execution status confirmation command to the servers 20, 22, for example, at predetermined cycles. Then, in a case where the execution status confirmation unit 25D receives a return value "1" from a server that has started the substitute process, the execution status confirmation unit 25D transmits a recovery notification to, for example, the schedule management unit 200A for notifying that a corresponding job management unit of the server can recover. Although the following example describes a case of recovery of the job management unit 22A of the server 22, the same applies to a case of recovery of the job management unit 20A of the server 20. Then, the schedule management unit 200A notifies the job execution management unit 200B that the job management unit 22A can recover. Then, the job execution management unit 200B instructs the virtual server 200Cb to stop executing the application program. In response to the instruction from the job execution management unit 200B, the virtual server 200Cb transfers the job data 210A stored in the storage device 210 to the storage device 23 of the server 22. The job data 210A transferred to the storage device 11 of the server 22 includes the process results of the virtual server 200Cb. When the above-described processes are completed, the virtual server setting unit 22C of the server 22 may, for example, request the server 200 to delete the virtual server 200Cb and the job data 210Ab. This request is hereinafter referred to as a "deletion request". FIG. 13 is a schematic diagram illustrating a state where the job management unit 220A has recovered from the state illustrated in FIG. 12.

<Substitute process preparation termination request>

As described above, in a case where a failover actually occurs, a corresponding virtual server starts to execute the substitute process. On the other hand, in a case where a failover does not occur, the virtual server setting unit 20C or 22C requests the server 200 to terminate the ready state for starting the substitute process. This request is hereinafter referred to as a "substitute process preparation termination request".

In a case where a predetermined condition is satisfied after making the substitute process preparation request, the virtual server setting unit 20C requests the server 200 to terminate the ready state for starting the substitute process. The predetermined condition is, for example, a condition in which a predetermined period from the substitute process preparation request has elapsed without the occurrence of a failover of the job management unit 20A. For example, the virtual server setting unit 20C may start counting time from the substitute process preparation request by using a timer. Then, when a predetermined period (e.g., approximately 30 min.) has elapsed after starting to count the time with the timer, the virtual server setting unit 20C makes the substitute process preparation termination request. The predetermined period may be set with a default value and changed by the user.

Similarly, in a case where a predetermined condition is satisfied after making the substitute process preparation request, the virtual server setting unit 22C requests the server 200 to terminate the ready state for starting the substitute process. The predetermined condition is, for example, a condition in which a predetermined period from the substitute process preparation request has elapsed without the occurrence of a failover of the job management unit 22A. For example, the virtual server setting unit 22C may start counting time from the substitute process preparation request by using a timer. Then, when a predetermined period (e.g., approximately 30 min.) has elapsed after starting to count the time with the timer, the virtual server setting unit 22C makes the substitute process preparation termination request. The predetermined period may be set with a default value and changed by the user.

Figure 14:
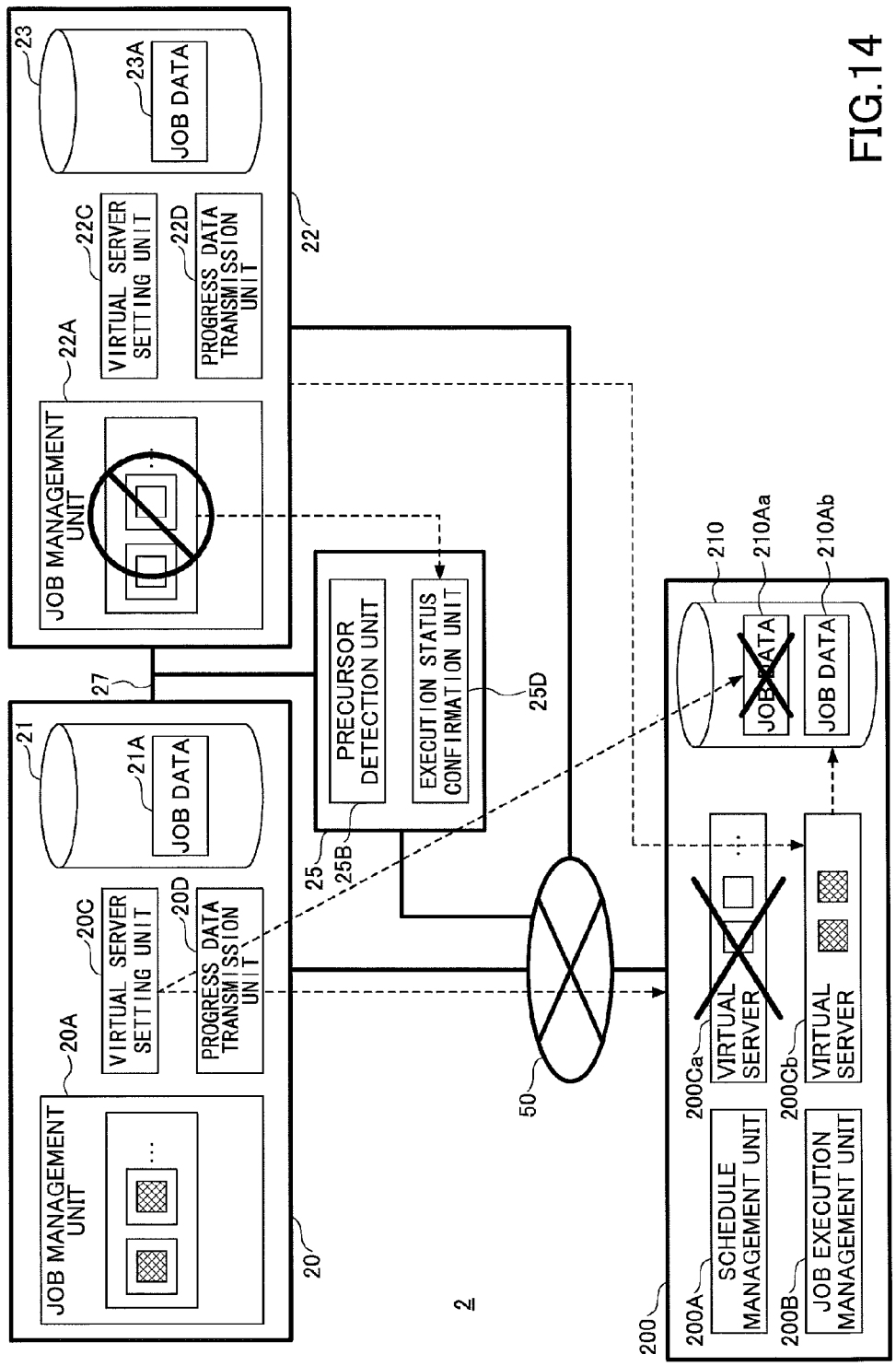
FIG. 14 is a schematic diagram illustrating a state where a predetermined period has elapsed without the occurrence of a failover of a job management unit according to an embodiment of the present invention.

The substitute process preparation termination request made by the virtual server setting unit 20C includes requesting the server 200 to delete the virtual server 200Ca and the job data 210Aa. The substitute process preparation termination request made by the virtual server setting unit 22C includes requesting the server 200 to delete the virtual server 200Cb and the job data 210Ab. FIG. 14 is a schematic diagram illustrating a state where the predetermined period has elapsed without the occurrence of a failover of the job management unit 20A. It is to be noted that FIG. 14 also illustrates a state in which a substitute process is started in a case where a failover has occurred in the job management unit 22A.

By the above-described processes, the operating cost of the server 20, 22 can be reduced. Because the server 200 is a server for providing a cloud service, typically, a fee is charged (accounted) in correspondence with the period (length of time) in which each of the virtual servers 200Ca, 200Cb is set (provided). Therefore, because the servers 20, 22 request the deletion of a corresponding virtual server when the predetermined period elapses from the time of making the substitute process preparation request in a case where a failover does not occur, the charge amount can be reduced in comparison with a case where the corresponding virtual server continues to exist even after the predetermined period has elapsed. Further, even in a case where the cloud service or the like is provided free of charge by the server 200 or run by the same entity (e.g., carrier) as the server 200, the memory capacity of the server 200 or the power consumption of the server 200 can be reduced. Therefore, the operating cost of the servers, 20, 22 can be reduced.

<Flowchart>

Figure 15:
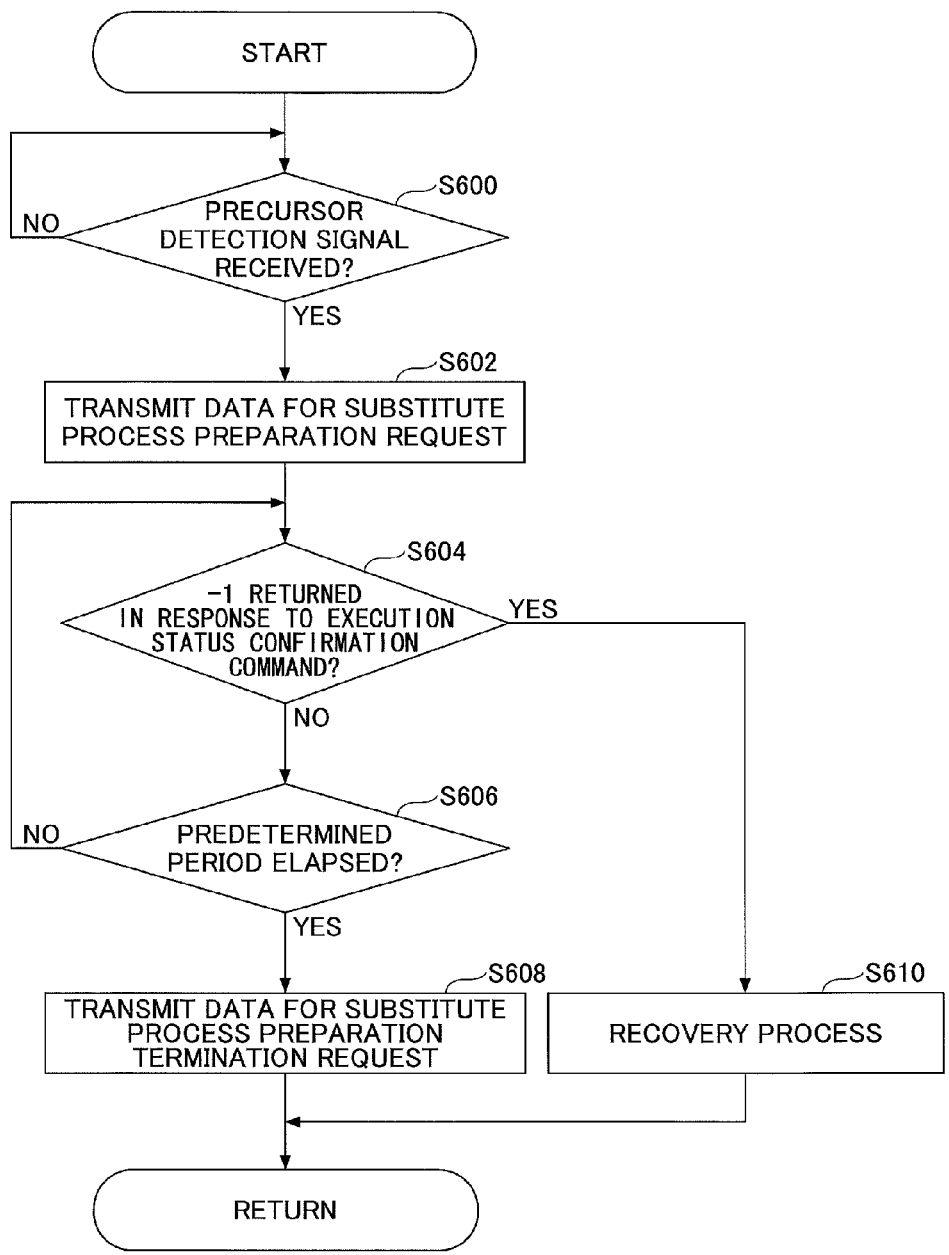
FIG. 15 is a flowchart illustrating an example of the flow of processes executed by virtual server setting units of servers according to the second embodiment.
Figure 16:
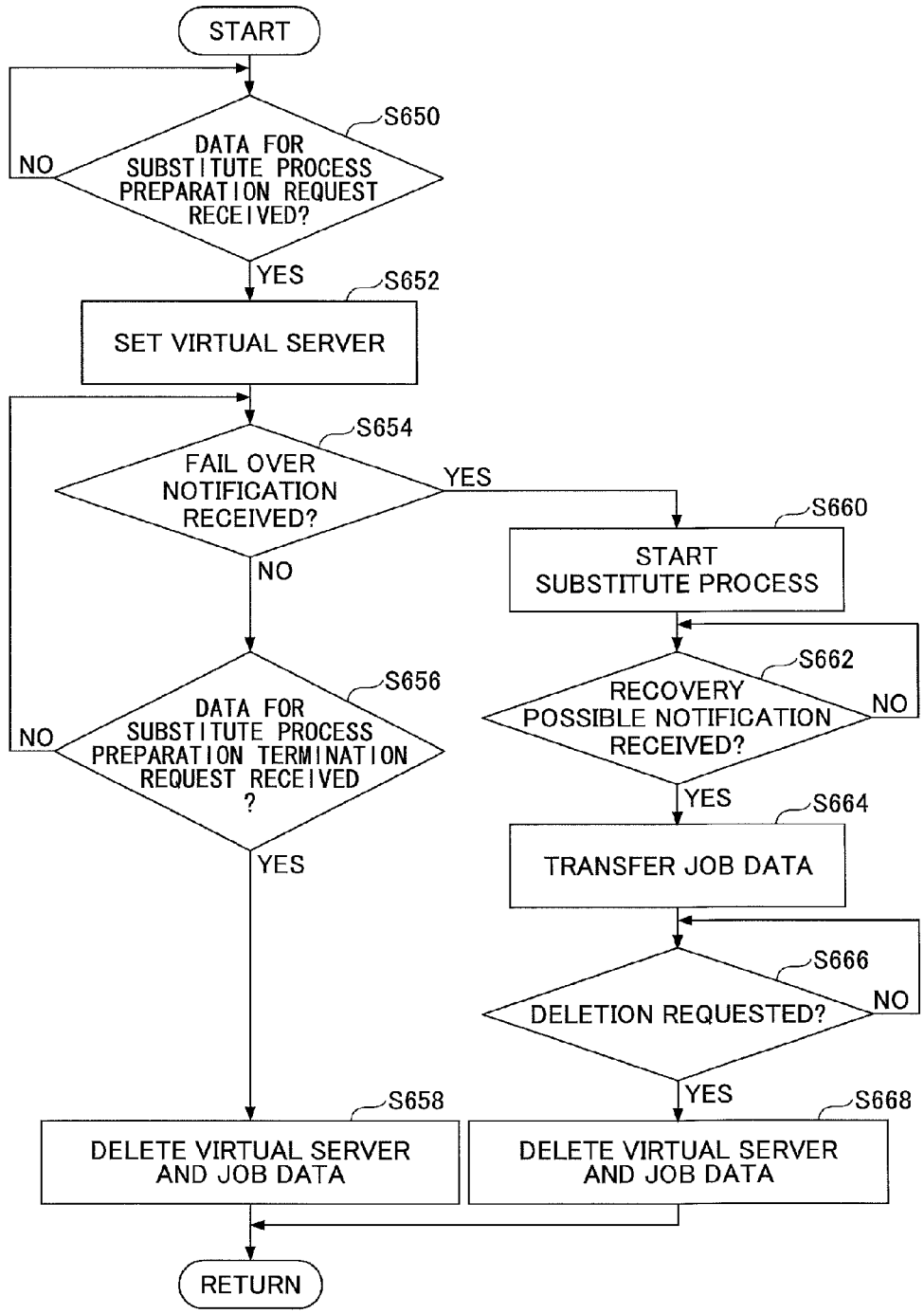
FIG. 16 is a flowchart illustrating an example of the flow of processes executed by a server according to the second embodiment.

FIG. 15 is a flowchart illustrating an example of the flow of processes executed by the virtual server setting units 20C, 22C of the servers 20, 22 according to the second embodiment. The flowchart of FIG. 15 may be repeatedly executed, for example, at predetermined cycles. Although the processes illustrated in FIGS. 15 and 16 are performed with respect to the server 20, the same processes may be applied with respect to the server 22.

First, the virtual server setting unit 20C waits (stands by) until a precursor detection signal is received from the precursor detection unit 25B (Step S600).

When the virtual server setting unit 20C receives a precursor detection signal (Yes in Step S600), the virtual server setting unit 20C transmits data for the substitute process preparation request to the server 200 (Step S602).

Then, the virtual server setting unit 20C determines whether a return value "−1" is returned from the server 200 in response to the execution status confirmation command (Step S604).

In a case where the return value "−1" is not returned from the server 200 in response to the execution status confirmation command (No in Step S604), the virtual server setting unit 20C determines whether a predetermined period has elapsed from the transmission of the data for the substitute process preparation request (Step S606). When the predetermined period has not elapsed from the transmission of the data for the substitute process preparation request (No in Step S606), the virtual server setting unit 20C returns to the determination process of Step S604.

When the predetermined period has elapsed from the transmission of the data for the substitute process preparation request (Yes in Step S606), the virtual server setting unit 20C transmits data for the substitute process preparation termination request to the server 200 (Step S608). Thereby, one routine of the flowchart of FIG. 15 is completed.

On the other hand, in a case where the return value "−1" is returned from the server 200 in response to the execution status confirmation command (Yes in Step S604), the virtual server setting unit 20C instructs the job management unit 20A to perform the recovery process (Step S610). Thereby, one routine of the flowchart of FIG. 15 is completed.

FIG. 16 is a flowchart illustrating an example of the flow of processes executed by the server 200 according to the second embodiment. The flowchart of FIG. 16 may be repeatedly executed, for example, at predetermined cycles.

First, the server 200 waits until receiving data for the substitute process preparation request from the server 20 (Step S650).

When the server 200 receives the data for the substitute process preparation request (Yes in Step S650), the server 200 sets the virtual server 200Ca (Step S652).

Then, the server 200 determines whether a failover occurrence notification is received from the execution status confirmation unit 25D (Step S654).

In a case where a failover occurrence notification is not received from the execution status confirmation unit 25D (No in Step S654), the server 200 determines whether data for the substitute process preparation termination request has been received from the server 20 (Step S656). In a case where the server 200 has not received the data for the substitute process preparation termination request from the server 200 (No in Step S656), the server 200 returns to the determination process in Step S654.

When the data for the substitute process preparation termination request is received (Yes in Step S656), the server 200 deletes the virtual server 200Ca and the job data 210A (Step S658). Thereby, one routine of the flowchart of FIG. 16 is completed.

On the other hand, in a case where a failover occurrence notification is received from the execution status confirmation unit 25D (Yes in Step S654), the server 200 starts the substitute process (Step S660).

When the substitute process is started, an OS (not illustrated) of the server 200 waits until receiving a recovery notification from the execution status confirmation unit 25D (Step S662). In this example, the recovery notification indicates that the job management unit 20A can recover.

In a case where the server 200 receives a recovery notification indicating that the job management unit 20A can recover (Yes in Step S662), the virtual server 200Ca of the server 200 transfers the job data 210Aa to the storage device 21 of the server 20 (Step S664).

Then, the server 200 waits until receiving data for the deletion request from the server 20 (Step S666). When the server 200 receives the data for the deletion request from the server 20 (Yes in Step S666), the server 200 deletes the virtual server 200Ca and the job data 210Aa (Step S668). Thereby, one routine of the flowchart of FIG. 16 is completed.

<Conclusion>

With the processing apparatus, the process system, and the program according to the above-described second embodiment, resources can be prevented from being wasted owing to the substitute process preparation termination request that is made when a predetermined period elapses from the time of the making the substitute process preparation request in a case where a failover does not occur.

Further, with the processing apparatus, the process system, and the program according to the above-described second embodiment, the ready state for starting the substitute process can be maintained owing to the progress data that changes in correspondence with the execution progress of a job after the substitute process preparation request is made.

In this embodiment, the execution status confirmation unit 25D is included in the server 25 to determine whether a failover has occurred. Alternatively, similar to the first embodiment, any of the servers 20, 22, 25 may transmit an execution status confirmation tool TL to the server 200 to allow the server 200 to perform execution status confirmation.

It is to be noted that, in the claims, the job management unit 20A, 22A correspond to, for example, a process unit, the virtual server setting unit 20C, 22C correspond to, for example, a control unit, the servers 20, 22 correspond to, for example, a processing apparatus, and the server 200 corresponds to, for example, a substitution processing apparatus.

Further, in the claims, the execution status confirmation unit 25D corresponds to, for example, an execution status confirmation unit.

<Third embodiment>

First, a processing apparatus, a process system, and a program according to a third embodiment of the present invention is described with reference to the accompanying drawings.

<Overall configuration>

Figure 17:
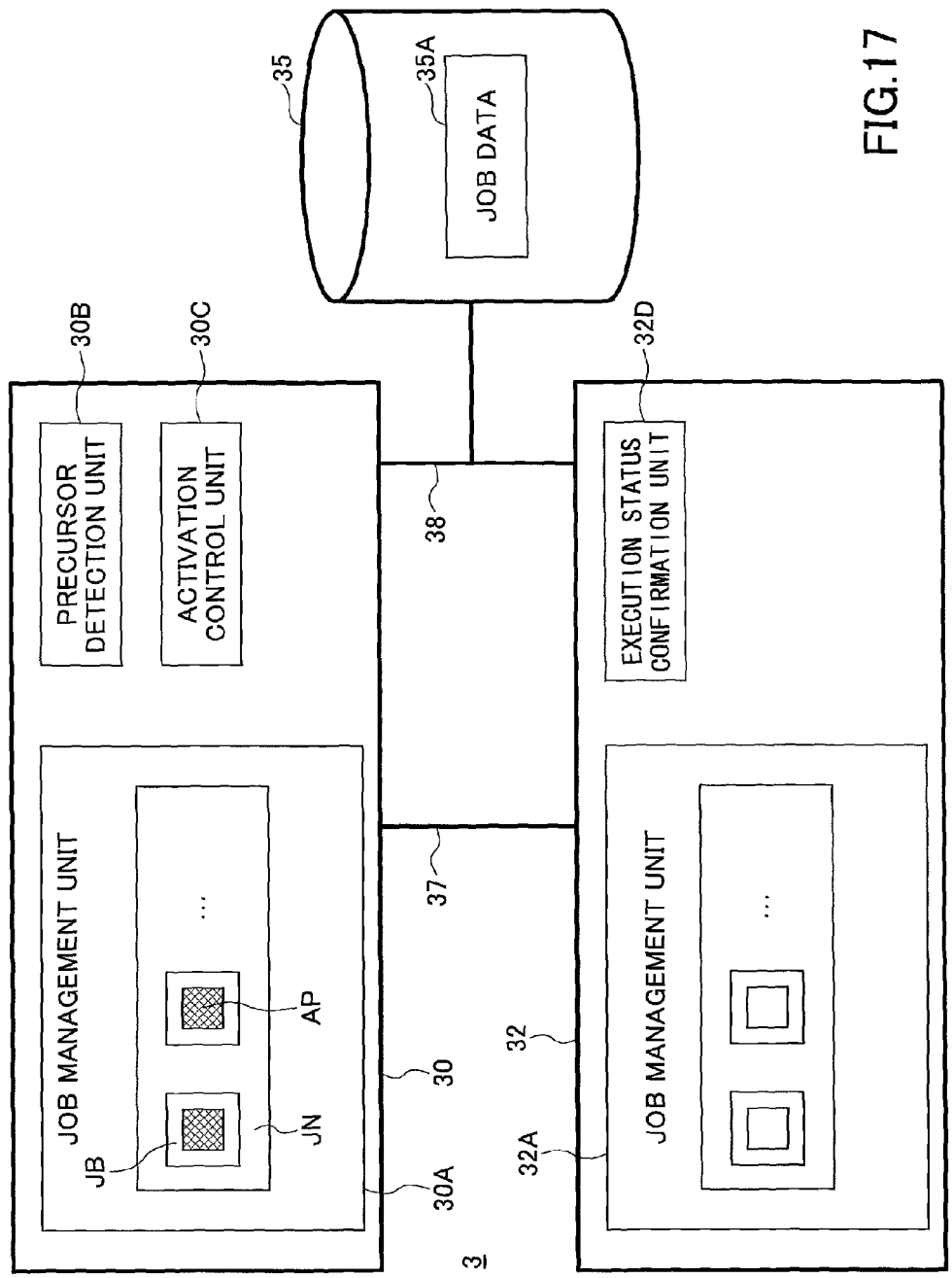
FIG. 17 illustrates an example of a system configuration of a process system according to the third embodiment of the present invention.

FIG. 17 illustrates an example of a system configuration of a process system 3 according to the third embodiment of the present invention. The process system 3 includes a server 30, a server 32, and a shared memory 35.

The server 30 performs voluntary processes according to a schedule such as a process of automatic operation of the system 3. The server 30 may also perform other processes. For example, the server 30 may be connected to a client computer via a LAN (Local Area Network), so that the server 10 can perform a process in response to a request from the client computer and provide the results of the process to the client computer. Further, the server 30 may perform a process in response to a request input from an input/output unit (not illustrated) by an operator.

The server 30 and the server 32 are connected to each other by, for example, a communication line 37. The server 32 functions as a substitution processing apparatus of the server 30. Further, the servers 30, 32 can access the shared memory 35, for example, by way of a memory bus 38.

In this embodiment, because the hardware configurations of the servers 30, 32 are substantially the same as those of, for example, the server 10 of the first embodiment, the hardware configurations of the servers 30, 32 can be referred in FIG. 2. Thus, further description the hardware configurations of the servers 30, 32 are omitted.

The server 30 includes functional units that are implemented by executing a program(s) stored in the auxiliary storage device D with the CPU A. The functional units of the server 30 are a job management unit 30A, a precursor detection unit 30B, an activation control unit 30C. Similarly, the server 32 includes functional units that are implemented by executing a program(s) stored in the auxiliary storage device D with the CPU A. The functional units of the server 32 are a job management unit 32A and an execution status confirmation unit 32D.

The functional units (function blocks) of the servers 30, 32 do not necessarily need to be implemented by separate distinct programs but may be implemented as a sub-routine or a function that is called from a program. Further, apart of the functional units (function blocks) may be, for example, an LSI, an IC, or a FPGA.

The shared memory 35 is, for example an auxiliary storage device or a memory. The shared memory 35 has job data 35A stored therein.

The job management unit 30A may perform various data processes described above. The processes performed by the job management unit 30A are performed in units of job nets JN. The job net JN is a set (aggregate) of jobs JB that include an application program AP. The job JB is an object including the application program AP for processing an operation (service) such as a batch-file/shell script or a command. The job net JN is a set of one or more jobs JB that constitute a sequential flow. The job management unit 30A is not limited to performing various data processes. For example, the job management unit 30A may perform processes for data management. The results of the processes performed by the job management unit 30A, the history of the job management unit 30A, and the like are stored as job data 35A in the shared memory 35.

The job data 35A includes, for example, a job name, a job number (job ID), a job status, schedule data, and an execution history (process result) of a job. In this embodiment, because an application program or a batch file executed by the job management unit 30A are retained in the server 32 that functions as the substitution processing apparatus of the server 30, the application program or batch file do not necessarily need to be included in the job data 35A.

The precursor detection unit 30B detects an event indicating a precursor of a failover that prevents the job management unit 30A from executing a process. Because the "event indicating a precursor of a failover" is substantially the same as that of the first embodiment, further description thereof is omitted. The precursor detection unit 30B determines (confirms) whether the below-listed events has occurred, for example, at a constant intervals. The determination of the precursor detection unit 30B may be performed at different intervals depending on each event.

When the precursor detection unit 30B detects an event indicating a precursor of a failover, the precursor detection unit 30B outputs the detection to the activation control unit 30C.

<Activation of the server 32>

When the precursor detection unit 30B detects the event indicating a precursor of a failover, the activation control unit 30C instructs, for example, a power circuit (not illustrated) and an OS (not illustrated) of the server 32 to activate the server 32.

Figure 18:
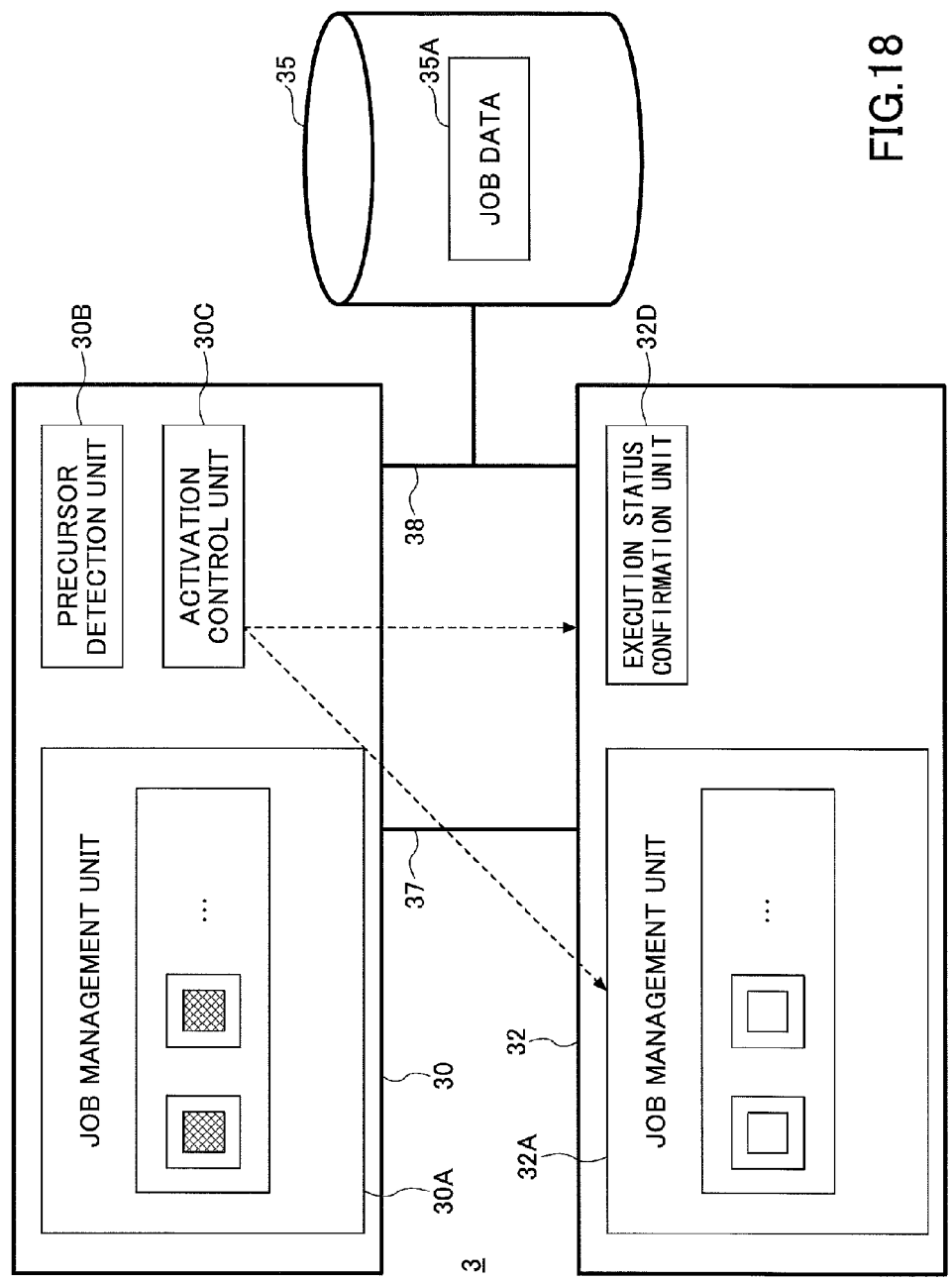
FIG. 18 is a schematic diagram illustrating a state of activating a server according to an embodiment of the present invention.

A program that enables the job management unit 32A to perform a substitute process (i.e., a similar process as the server 30) by referring to the job data 35A is stored beforehand in, for example, the auxiliary storage device D of the server 32. Accordingly, when the activation control unit 30C is activated, the server 32 activates a main process, so that the job management unit 32A becomes an operational state. Thereby, the job management unit 32A becomes a ready state for starting the substitute process of the job management unit 30A. FIG. 18 is a schematic diagram illustrating a state of activating the server 32.

<Execution status confirmation>

In order to confirm the execution status of the job management unit 30A, the execution status confirmation unit 32D of the server 32 transmits an execution status confirmation command (check process) to the server 30, for example, at predetermined cycles.

When the server 30 receives the execution status confirmation command, the server 30 executes an instruction written in the execution status confirmation command. Because the flow of processes performed by the server 30 is substantially the same as the flow illustrated in FIG. 4 of the first embodiment, further description thereof is omitted. A return value of the execution status confirmation command is returned to the execution status confirmation unit 32 of the server 32 in response to the execution status confirmation command.

<Start of substitute process>

Figure 19:
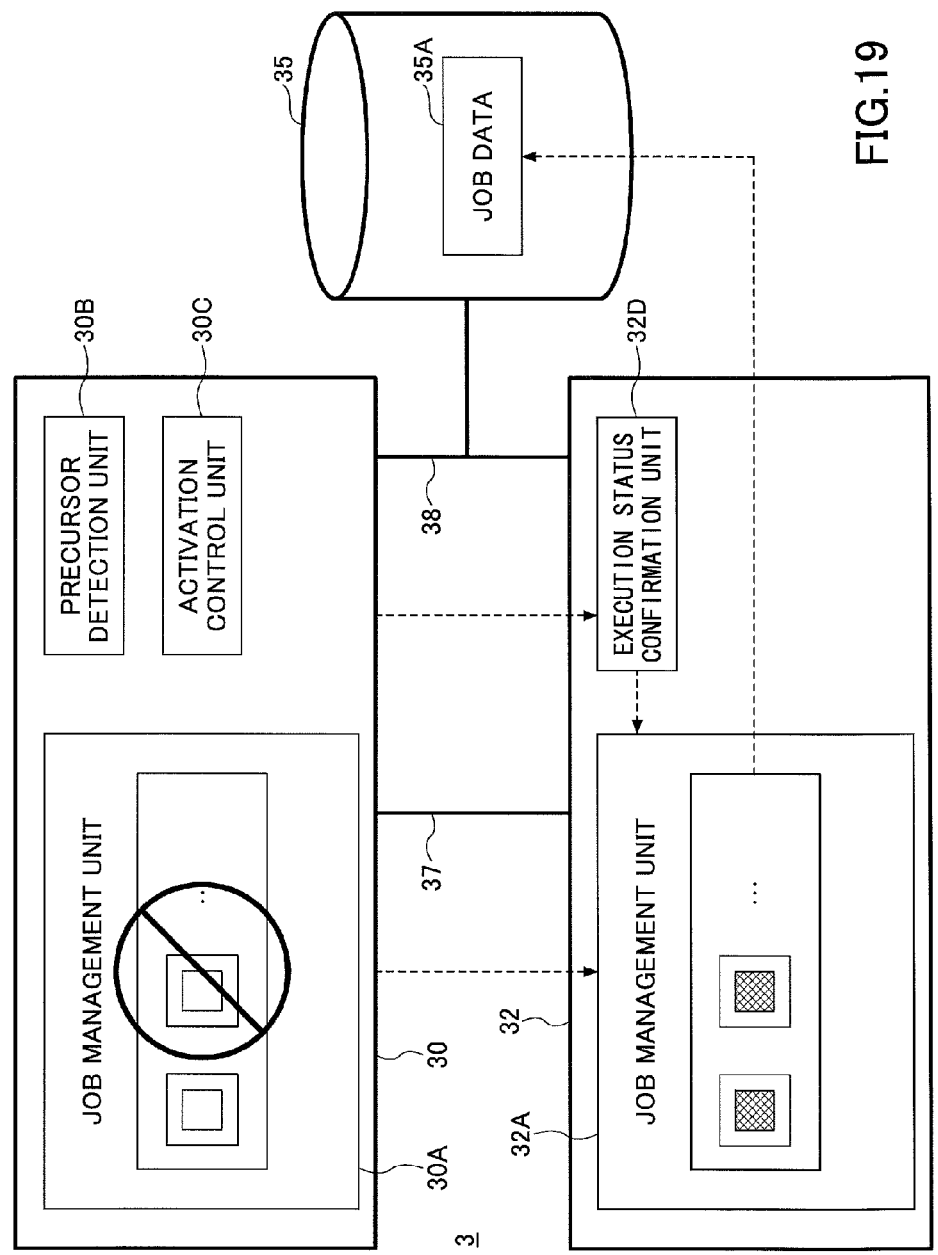
FIG. 19 is a schematic diagram illustrating a state where a substitute process has been started by a job management unit according to an embodiment of the present invention.

When the server 32 receives the return value "−1" from the server 30, the execution status confirmation unit 32D determines that a failover (preventing the job management unit 30A from executing a process) has occurred and instructs the job management unit 32A to start the substitute process. For example, the job management unit 32A obtains data input to the job management unit 30A from the server 30 and performs a process similar to a process performed by the job management unit 30A. Then, the job management unit 32A stores a result of the process in the shared memory 35. The process results is, for example, added to a portion of the job data 35A. FIG. 19 is a schematic diagram illustrating a state where the substitute process has been started by the job management unit 32.

<Recovery process>

Even after the substitute process is started, the execution status confirmation unit 32D transmits the execution status confirmation command to the server 30, for example, at predetermined cycles. Then, in a case where the execution status confirmation unit 32D receives a return value "1" from the server 30, the execution status confirmation unit 32D instructs the job management unit 32A to stop the substitute process. Further, the server 32 is shut down and the power of the server 32 is switched off.

<Substitute process preparation termination>

As described above, in a case where a failover has occurred, the job management unit 32A starts to execute the substitute process. In a case where a failover does not occur, the activation control unit 30C performs a control for shutting down the server 32 and switching off the power of the server 32.

Figure 20:
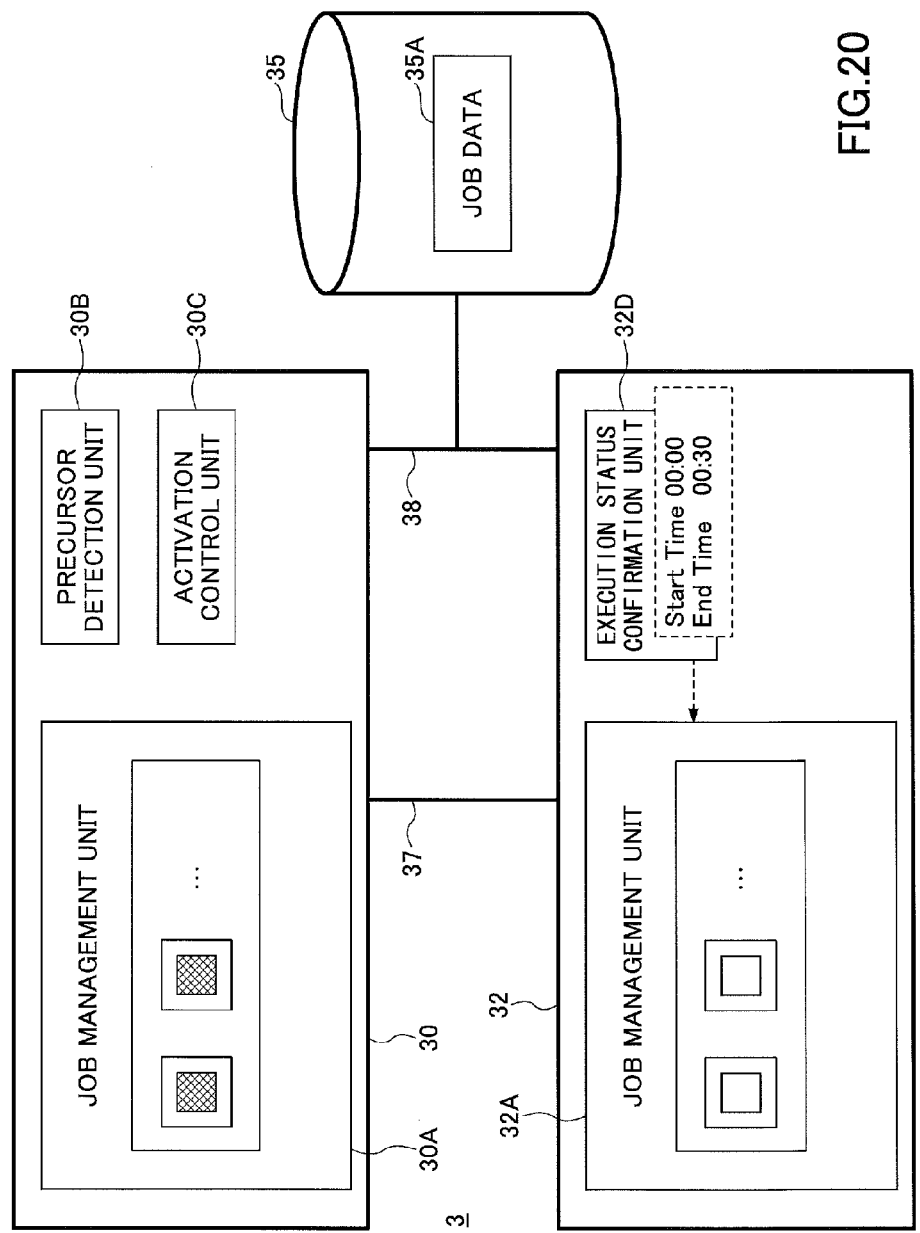
FIG. 20 is a schematic diagram illustrating a state where a predetermined period has elapsed without the occurrence of a failover of a job management unit according to an embodiment of the present invention.

In a case where a predetermined condition is satisfied after activating the server 32, the activation control unit 30C performs a control for shutting down the server 32 and switching off the power of the server 32. The predetermined condition is, for example, a condition in which a predetermined period from the activation of the server 32 (or activation of the main process of the job management unit 32A) substitute process preparation request has elapsed without the occurrence of a failover of the job management unit 30A. For example, the activation control unit 30C may start counting time from the activation of the server 32 by using a timer. Then, when a predetermined period (e.g., approximately 30 min.) has elapsed after starting to count the time with the timer, the activation control unit 30C shuts down the server 32 and switches off the power of the server 32. The predetermined period may be set with a default value and changed by the user. FIG. 20 is a schematic diagram illustrating a state where the predetermined period has elapsed without the occurrence of a failover of the job management unit 30A.

By the above-described processes, the operating cost of the servers 30, 32 can be reduced. Because the server 32 is shut down when a predetermined period elapses from the time of activating the server 32 (i.e., becoming a ready state for starting the substitute process) in a case where a failover does not occur, the power consumption of the server 32 can be reduced. Further, because process results and the like of a job are stored in the shared memory 35 that can be accessed by both servers 30, 32, the ready state for starting the substitute process can be maintained. As a result, the exchanging of processes between the servers 30 and 32 can be promptly performed.

<Flowchart>

Figure 21:
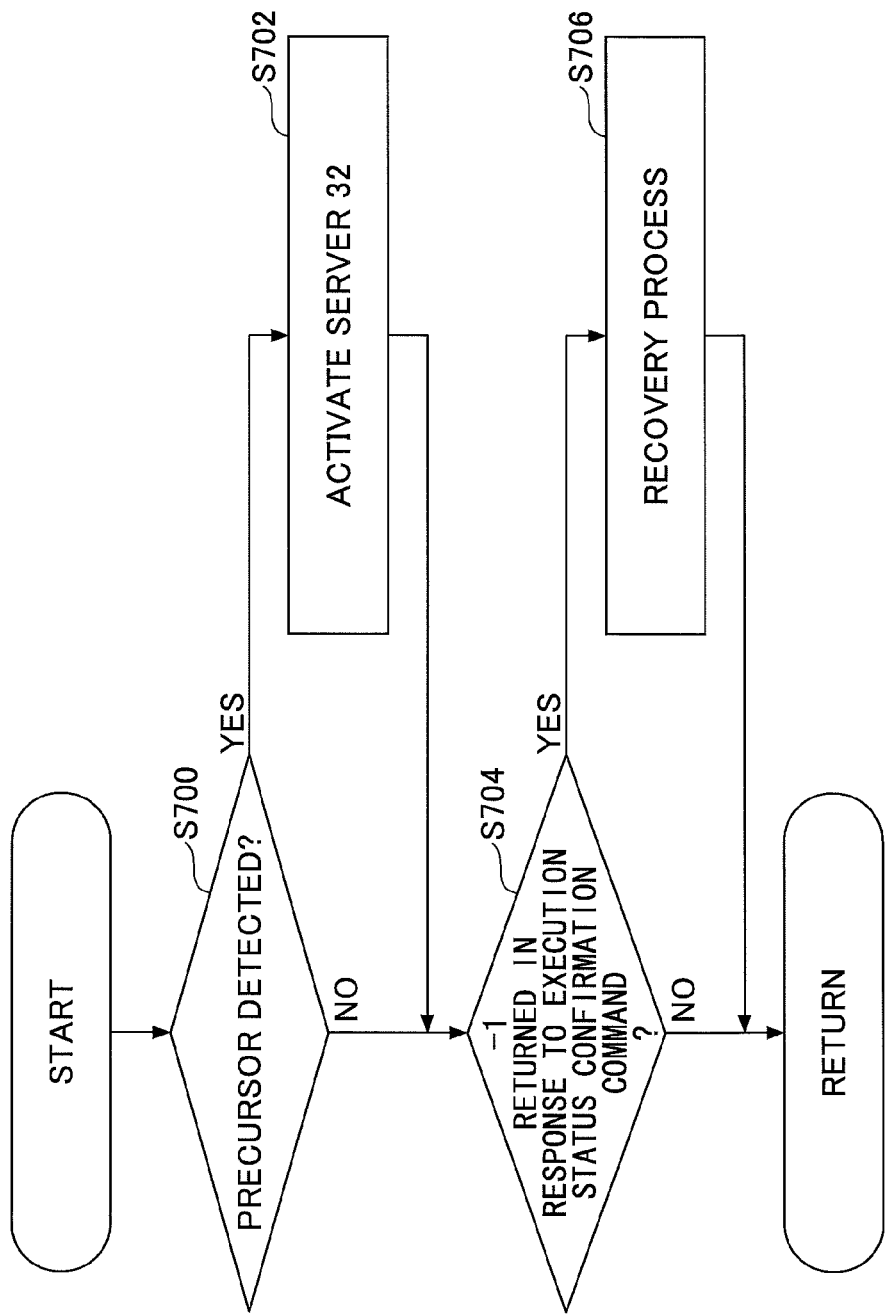
FIG. 21 is a flowchart illustrating an example of the flow of processes executed by an activation control unit of a server according to the third embodiment.

FIG. 21 is a flowchart illustrating an example of the flow of processes executed by the activation control unit 30C of the server 30 according to the third embodiment. The flowchart of FIG. 21 may be repeatedly executed, for example, at predetermined cycles.

First, the activation control unit 30C determines whether the precursor detection unit 30B has detected an event indicating a precursor of a failover (Step S700).

When the precursor detection unit 30B detects an event indicating a precursor of a failover (Yes in Step S700), the activation control unit 30C activates the server 32 (Step S702).

Then, the activation control unit 30C determines whether a return value "−1" is returned to the server 32 in response to the execution status confirmation command (Step S704).

In a case where the return value "−1" is returned to the server 32 in response to the execution status confirmation command (Yes in Step S704), the activation control unit 30C instructs the job management unit 30A to perform the recovery process (Step S706).

Figure 22:
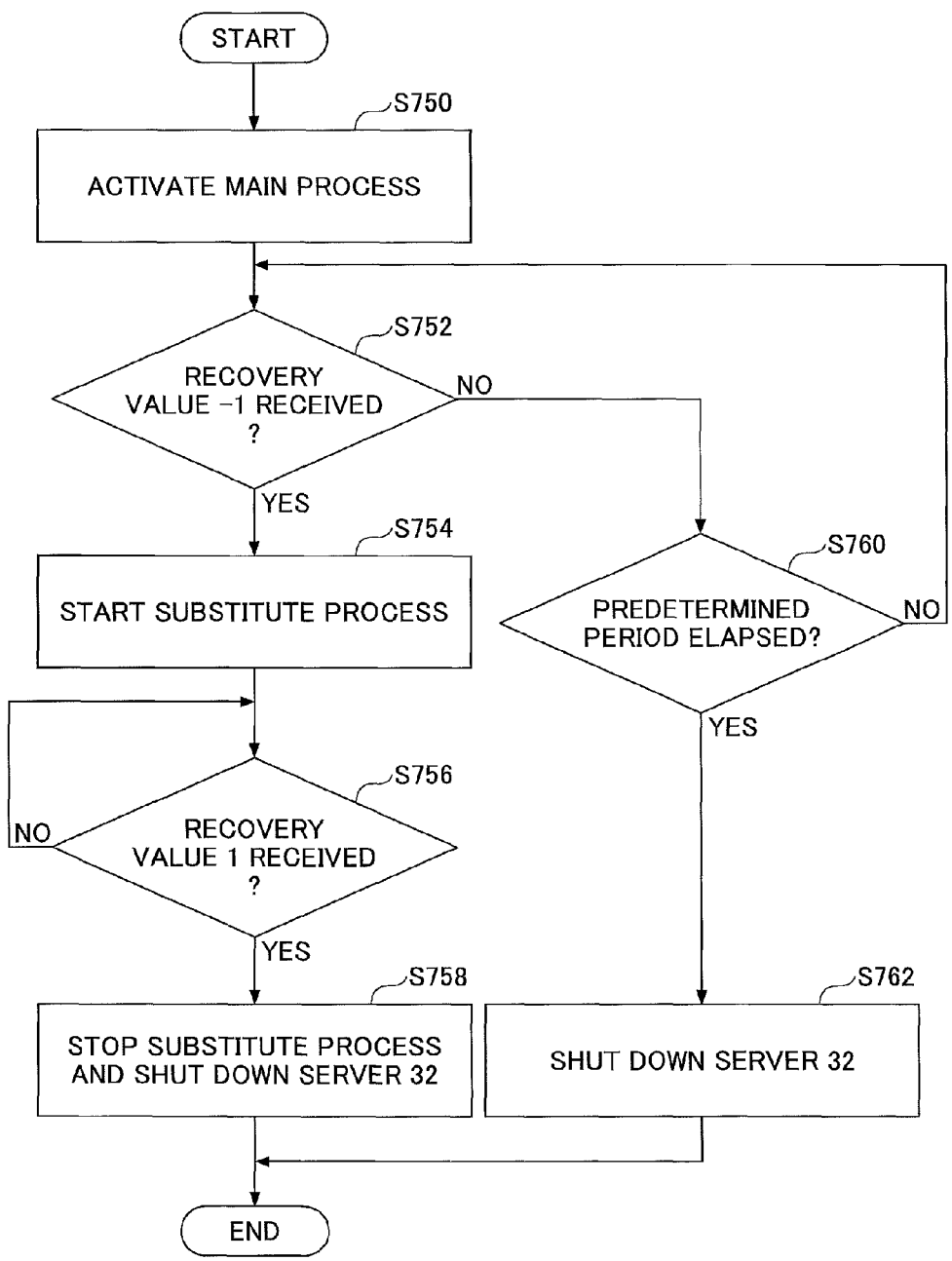
FIG. 22 is a flowchart illustrating an example of the flow of processes executed by an execution status confirmation unit of a server according to the third embodiment.

FIG. 22 is a flowchart illustrating an example of the flow of processes executed by the execution status confirmation unit 32D of the server 32 according to the third embodiment. The flowchart of FIG. 22 is started when the server 32 is activated.

First, the execution status confirmation unit 32D activates a main process for enabling the job management unit 32A to function (Step S750).

Then, the execution status confirmation unit 32D determines whether a return value "−1" is received from the server 30 (Step S752).

In a case where the return value "−1" is received from the server 30 (Yes in Step S752), the execution status confirmation unit 32D instructs the job management unit 32A to start the substitute process for the job management unit 30 (Step S754).

Then, the execution status confirmation unit 32D waits until receiving a return value "1" from the server 30 (Step S756). In a case where the return value "1" is received from the server 30, the execution status confirmation unit 32D instructs the job management unit 32A to stop the substitute process, shuts down the server 32, and switches off the server 32 (Step S758).

On the other hand, in a case where the execution status confirmation unit 32D determines that a return value "−1" is not received from the server 30 (No in Step S752), the execution status confirmation unit 32D determines whether a predetermined period has elapsed from the activation of the server 32 (Step S760). In a case where the predetermined period has not elapsed from the activation of the server 32 (No in Step S760), the execution status confirmation unit 32D returns to the determination process of Step S752.

In a case where the predetermined period has elapsed from the activation of the server 32 (Yes in Step S760), the execution status confirmation unit 32D shuts down the server 32 and switches off the power of the server 32 (Step S762).

CONCLUSION

With the processing apparatus, the process system, and the program according to the above-described third embodiment, consumption of electric power can be reduced owing to the shutting down of the server 32 when a predetermined period elapses from the time of activating the server 32 in a case where a failover does not occur. Further, With the processing apparatus, the process system, and the program according to the above-described third embodiment, resources can be prevented from being wasted. Further, because process results and the like of a job are stored in the shared memory 35 that can be accessed by both servers 30, 32, the ready state for starting the substitute process can be maintained. As a result, the exchanging of processes between the servers 30 and 32 can be promptly performed.

It is to be noted that, in the claims, the job management unit 30A corresponds to, for example, a process unit, the activation control unit 30C corresponds to, for example, a control unit, and the server 32 corresponds to, for example, a substitution processing apparatus.

The above-described embodiments of the present invention can reduce the wasting of resources. The above-described embodiments of the present invention may be used in, for example, a computer manufacturing industry, a computer software industry, a computer service providing industry, or a data management service providing industry.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it is to be understood that various changes, substitutions, and alterations could be made hereto without departing from the spirit and scope of the invention.

For example, other than the above-described embodiments, both the "processing apparatus" and the "substitution processing apparatus" may be an apparatus that provides a cloud service.

What is claimed is:

1. A processing apparatus comprising:
a memory; and
a processor coupled to the memory and configured to perform:
detecting a precursor event indicating that there is a possibility of an impending failure to execute a process of a process unit;
sending a preparation request to a substitution processing apparatus when the precursor event is detected, the preparation request requesting the substitution processing apparatus being a ready state for starting a substituting processing; and
sending a termination request to the substitution processing apparatus in response to detecting a passage of a predetermined time period without an occurrence of the impending failure after sending the preparation request, the termination request requesting the substitution processing apparatus terminating the ready state.

2. The processing apparatus as claimed in claim 1, wherein the processor is configured to transmit data that changes in correspondence with a progress of the process of the process unit to the substitution processing apparatus after sending the preparation request.

3. The processing apparatus as claimed in claim 2,
wherein the substitution processing apparatus is an apparatus that provides a cloud service,
wherein the processor is configured to transmit a program for executing the substituting processing to the substitution processing apparatus when sending the preparation request.

4. The processing apparatus as claimed in claim 1,
wherein the processor is configured to transmit a program for confirming an execution status of the process of the process unit to the substitution processing apparatus when sending the preparation request,
wherein the processor is configured to send a start request to the substitution processing apparatus, so that the substitution processing apparatus starts the substituting processing when the substitution processing apparatus executes the program and confirms an occurrence of the failure to execute the process of the process unit.

5. The processing apparatus as claimed in claim 1, wherein the processor is further configured to determine whether the failure to execute the process of the process unit has occurred after sending the preparation request, and is configured to send a start request to the substitution processing apparatus, so that the substitution processing apparatus starts the substituting processing, upon determining that the failure to execute the process of the process unit has occurred.

6. The processing apparatus as claimed in claim 1, wherein the termination of the ready state includes deleting data to be used for the substituting processing.

7. A non-transitory computer-readable recording medium storing therein a program that causes a computer to execute a process comprising:

detecting a precursor event indicating that there is a possibility of an impending failure to execute a process of a process unit;

sending a preparation request to a substitution processing apparatus, when detecting the precursor event, the preparation request requesting the substitution processing apparatus being a ready state for starting a substituting processing; and sending a termination request to the substitution processing apparatus in response to detecting a passage of a predetermined time period without an occurrence of the impending failure after sending the preparation request, the termination request requesting the substitution processing apparatus terminating the ready state.

8. The non-transitory computer-readable recording medium as claimed in claim 7, wherein the process further comprises transmitting data that changes in correspondence with a progress of the process of the process unit to the substitution processing apparatus after the sending of the preparation request.

9. The non-transitory computer-readable recording medium as claimed in claim 8, wherein the substitution processing apparatus is an apparatus that provides a cloud service, wherein the process further comprises transmitting a program for executing the substituting processing to the substitution processing apparatus when sending the preparation request.

10. The computer-readable recording medium as claimed in claim 9, wherein the process further comprises transmitting a program for confirming an execution status of the process of the process unit to the substitution processing apparatus when sending the preparation request, and sending a start request to the substitution processing apparatus, so that the substitution processing apparatus starts the substituting processing when the substitution processing apparatus executes the program and confirms an occurrence of the failure to execute the process of the process unit.

11. The non-transitory computer-readable recording medium as claimed in claim 7, wherein the process further comprises determining whether the failure to execute the process of the process unit has occurred after sending the preparation request, and sending a start request to the substitution processing apparatus, so that the substitution processing apparatus starts the substituting processing, upon determining that the failure to execute the process of the process unit has occurred.

12. The non-transitory computer-readable recording medium as claimed in claim 7, wherein the termination of the ready state includes deleting data to be used for the substituting processing.

13. A process system comprising:
    a processing apparatus including:
        a memory; and
        a processor coupled to the memory and configured to perform:
        detecting a precursor event indicating that there is a possibility of an impending failure to execute a process of a process unit, and
        sending a preparation request to a substitution processing apparatus when the precursor event is detected, the preparation request requesting the substitution processing apparatus being a ready state for starting a substituting processing; and
    the substitution processing apparatus configured to terminate the ready state in response to a passage of a predetermined time period without an occurrence of the impending failure after the preparation request is sent.

14. The process system as claimed in claim 13, wherein the processing apparatus is configured to store data that changes in correspondence with a progress of the process of the process unit in a storage device after sending the preparation request, wherein the storage device can be accessed by the substitution processing apparatus.

15. The process system as claimed in claim 13, wherein the substitution processing apparatus is configured to determine whether the failure to execute the process of the process unit has occurred after the preparation request is sent, wherein the substitution processing apparatus is configured to start the substituting processing upon determining that the failure to execute the process of the process unit has occurred.

16. The process system as claimed in claim 13, wherein the termination of the ready state includes deleting data to be used for the substituting processing.

* * * * *